United States Patent
Aoyama et al.

(10) Patent No.: US 10,377,425 B2
(45) Date of Patent: Aug. 13, 2019

(54) WORK VEHICLE

(71) Applicant: Kubota Corporation, Osaka-shi (JP)

(72) Inventors: Kenichi Aoyama, Sakai (JP); Maho Yamanaka, Sakai (JP); Yoshiyuki Tamura, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/556,809

(22) PCT Filed: Mar. 10, 2016

(86) PCT No.: PCT/JP2016/057666
§ 371 (c)(1),
(2) Date: Sep. 8, 2017

(87) PCT Pub. No.: WO2016/143875
PCT Pub. Date: Sep. 15, 2016

(65) Prior Publication Data
US 2018/0050729 A1 Feb. 22, 2018

(30) Foreign Application Priority Data

Mar. 11, 2015 (JP) ................................. 2015-048650
Mar. 18, 2015 (JP) ................................. 2015-055059

(51) Int. Cl.
*B60Q 1/24* (2006.01)
*B62D 25/12* (2006.01)
(Continued)

(52) U.S. Cl.
CPC .............. *B62D 25/12* (2013.01); *B60K 11/06* (2013.01); *B60Q 1/0041* (2013.01); *B60Q 1/18* (2013.01);
(Continued)

(58) Field of Classification Search
CPC ... B60Q 1/18; B60Q 1/20; B60Q 1/24; B60Q 1/56; B60R 13/005
See application file for complete search history.

(56) References Cited

U.S. PATENT DOCUMENTS

| 1,428,108 A | * | 9/1922 | Maddux | ................... | B60Q 1/24 |
| | | | | | 362/247 |
| 1,448,636 A | * | 3/1923 | Montague | ................ | B60Q 1/24 |
| | | | | | 248/289.11 |

(Continued)

FOREIGN PATENT DOCUMENTS

| EP | 0757945 A2 | 2/1997 |
| EP | 2610147 A2 | 7/2013 |

(Continued)

*Primary Examiner* — Katy M Ebner
(74) *Attorney, Agent, or Firm* — The Webb Law Firm

(57) ABSTRACT

A work vehicle according to the present invention includes: a recessed portion (4) that is provided in a lateral side surface (31a) of an engine hood (30) and is recessed from the lateral side surface (31a) toward the inside of the engine hood (30). The recessed portion (4) includes a recessed portion bottom surface (41) that is recessed inward from the lateral side surface (31a) of the engine hood (30), and a peripheral wall portion (42) that is continuous with a peripheral edge of the recessed portion bottom surface (41) and a peripheral edge of a recessed portion inlet opening (40) that is formed in the lateral side surface (31a). A work light (5) that emits light forward and downward is provided on the peripheral wall portion (42).

6 Claims, 18 Drawing Sheets

(51) Int. Cl.
  *B60Q 1/18* (2006.01)
  *B62D 7/08* (2006.01)
  *B62D 7/18* (2006.01)
  *F16J 15/52* (2006.01)
  *B60K 11/06* (2006.01)
  *B60Q 1/00* (2006.01)
  *B62D 49/00* (2006.01)
  *B62D 25/10* (2006.01)

(52) U.S. Cl.
  CPC ............... *B60Q 1/24* (2013.01); *B62D 7/08* (2013.01); *B62D 7/18* (2013.01); *B62D 49/00* (2013.01); *F16J 15/52* (2013.01); *B62D 25/10* (2013.01)

(56) References Cited

U.S. PATENT DOCUMENTS

| | | | | |
|---|---|---|---|---|
| 1,624,436 | A * | 4/1927 | Rosemier | B60Q 1/24 362/506 |
| 5,872,656 | A * | 2/1999 | Horwill | B60Q 1/00 359/601 |
| 8,430,523 | B1 * | 4/2013 | Smith | F21V 29/004 362/235 |
| 10,023,110 | B1 * | 7/2018 | Salter | B60Q 1/56 |
| 2003/0012033 | A1 * | 1/2003 | Shikiya | F21S 43/50 362/543 |
| 2003/0175068 | A1 | 9/2003 | Abels et al. | |
| 2004/0114378 | A1 * | 6/2004 | Nakamura | B60Q 1/0041 362/459 |
| 2004/0207519 | A1 * | 10/2004 | Tracy | A61H 3/061 340/467 |
| 2007/0109801 | A1 * | 5/2007 | Panopoulos | B60Q 1/12 362/465 |
| 2016/0152187 | A1 | 6/2016 | Kawashiri et al. | |
| 2017/0129542 | A1 * | 5/2017 | Kurokawa | A01B 69/02 |

FOREIGN PATENT DOCUMENTS

| | | |
|---|---|---|
| JP | 4122238 U | 11/1992 |
| JP | 200197237 A | 4/2001 |
| JP | 2003341424 A | 12/2003 |
| JP | 2004106787 A | 4/2004 |
| JP | 2004521291 A | 7/2004 |
| JP | 2004224274 A | 8/2004 |
| JP | 2005119430 A | 5/2005 |
| JP | 2006315571 A | 11/2006 |
| JP | 2007137236 A | 6/2007 |
| JP | 200887569 A | 4/2008 |
| JP | 201064690 A | 3/2010 |
| WO | 2015012036 A1 | 1/2015 |

* cited by examiner

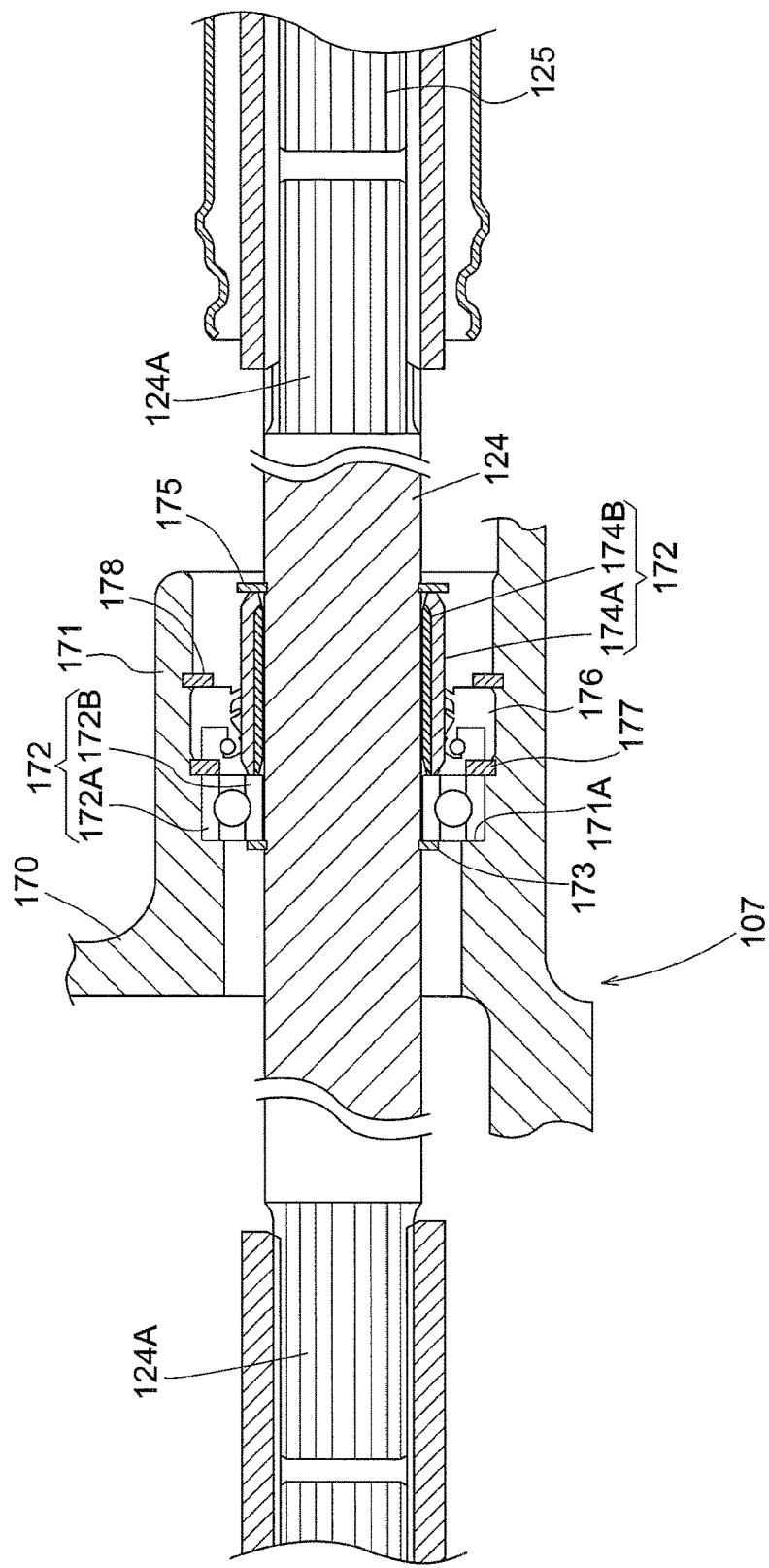

WORK VEHICLE

CROSS-REFERENCE TO RELATED APPLICATIONS

This application is the United States national phase of International Application No. PCT/JP2016/057666 filed Mar. 10, 2016, and claims priority to Japanese Patent Application Nos. 2015-048650 and 2015-055059, filed Mar. 11, 2015 and Mar. 18, 2015, respectively, the disclosures of which are hereby incorporated in their entirety by reference.

TECHNICAL FIELD

The present invention relates to a work vehicle comprising: a headlight that is provided at a forward position of an engine hood; and a work light located on a lateral side portion of the engine hood.

The present invention also relates to a work vehicle comprising a wheel support casing that is coupled to a front axle casing so as to be steerable, using a kingpin that is provided on an extended end portion of the front axle casing, in which wheel support casing is configured to be steerable by coupling a tie rod that is provided forward of the front axle casing.

BACKGROUND ART

Examples of work vehicles that includes an engine hood with a headlight and a work light is disclosed in [1] and [2] below.

[1] A tractor comprising: a headlight provided at an upper front position of an engine hood; and a work light provided at a front lateral side position of a lower end portion of the engine hood (see Patent Literature 1).

[2] A tractor comprising: a headlight provided at an upper front position of an engine hood; and a work light fitted into an opening that is formed at a position lower than the headlight and higher than a side grill that extends continuous with a lateral side portion of a front grill of a ventilation grill (see Patent Literature 2).

Another example of such work vehicles is disclosed in [3] below.

A tractor comprising a wheel support casing that is coupled to a front axle casing so as to be steerable, using a kingpin that is provided on an extended end portion of the front axle casing, in which wheel support casing is configured to be steerable by coupling a tie rod that is provided forward of the front axle casing (see Patent Literature 3).

PRIOR ART DOCUMENTS

Patent Literatures

Patent Literature 1: JP 2007-137236 A (paragraphs 0026 and 0027; and FIGS. 2, 3 and 6)
Patent Literature 2: JP 2006-315571 A (paragraphs 0015 and 0016; and FIGS. 1, 3 and 4)
Patent Literature 3: JP 2001-97237 A (paragraphs 0009 and 0010; and FIGS. 1, 2 and 3)

SUMMARY OF THE INVENTION

Problem to be Solved by the Invention

In the conventional structure as disclosed in [1] above, attachment portions for work lights are provided near a lower end portion of a front portion of the engine hood, and work lights are coupled to attachment members that are provided for the engine hood.

Such a configuration is advantageous in that the work lights can be located near the front end of the engine hood, near the ground. However, in this structure, portions of the work lights protrude forward or laterally outward from the self-propelled vehicle body at low positions thereof. Therefore, there is the risk of the work lights getting soiled or damaged at an early stage due to contact with crops or weeds, and there is room for improvement in this respect.

In the conventional structure as disclosed in [2] above, openings surrounded by side grills and an engine hood are formed above the side grills in a front portion of the engine hood. Work lights are fitted into the openings, and the work lights are supported by attachment members that are provided at supporting members standing on the engine hood or a vehicle body frame, for example.

Since the work lights are located adjacent to the side grills, this structure is advantageous in that it is easier to make the work lights less likely to come into contact with crops and weeds. However, the attachment structure for the work lights tends to be complex, and there is room for improvement in this respect.

Considering the above-described structures, it is desirable that the work lights are less likely to come into contact with crops and weeds when work lights are attached to a front portion of the engine hood, and that an attachment structure therefor is easy to be simplified.

In the conventional structure as disclosed in [3] above, on the other hand, the tie rods are entirely exposed to the outside on the front side of the travelling vehicle body. Therefore, there is the risk of the tie rods per se being entangled with weeds and crops.

In order to reduce such a risk, tie rod covers that cover the tie rods from the front side (not shown) may be attached to e.g. the front axle casing so as to prevent the tie rods from coming into contact with other objects. Using such tie rod covers is advantageous in that the tie rods are easy to prevent from coming into contact with weeds and crops when the travelling vehicle body travels forward to perform an implement work, and from being entangled with weeds and crops.

However, when the travelling vehicle body turns around, the tie rods rotate the wheel support casings about the kingpins, and therefore a portion of the tie rod that lies inside the turn protrudes laterally outward (i.e. inward in the direction in which a turning radius extends) from the tie rod cover. If the portion of the tie rod protrudes laterally outward from the tie rod cover, the portion cannot be protected by the tie rod covers against contact.

The portions of the tie rods, which protrude laterally outward from the tie rod covers when the travelling vehicle body turns around, are coupled to the wheel support casings to be rotatable relative to the wheel support casings, via coupling shafts. Positions at which the portions of the tie rods and the wheel support casings are coupled to each other are covered by dustproof boots. Since the dustproof boots also protrude laterally outward from the tie rod covers along with the portions of the tie rods protruding when a turn is made, there is the risk of the dustproof boots being damaged at an early stage in a work environment where the dustproof boots often come into contact with weeds and crops.

Considering the above-described problem, it is desired that the dustproof boots, which are provided at the positions where the tie rods and the wheel support casings are coupled to each other, be prevented from being damaged at an early stage due to contact with weeds and crops when a turn is made, and that the durability of the dustproof boots be thereby improved.

Solution to the Problem

A work vehicle according to the present invention comprises:
an engine hood that is provided in a front portion of a vehicle body;
a headlight that is provided at a forward position of the engine hood; and
a recessed portion that is provided in a lateral side surface of the engine hood and is recessed from the lateral side surface toward the inside of the engine hood,
wherein the recessed portion includes a recessed portion bottom surface that is recessed inward from the lateral side surface of the engine hood, and a peripheral wall portion that is continuous with a peripheral edge of the recessed portion bottom surface and a peripheral edge of a recessed portion inlet opening that is formed in the lateral side surface, and
a work light that emits light forward and downward is provided on the peripheral wall portion.

With the above-described configuration, a recessed portion that is recessed toward the inside of an engine hood is provided in a lateral side surface of the engine hood, and a work light that emits light forward and downward is provided on a peripheral wall portion of the recessed portion. Therefore, it is easier to prevent the work light from protruding forward or laterally outward of the self-propelled vehicle body.

In addition, the peripheral wall portion, which is naturally formed when the recessed portion is formed, is used as a portion to which a work light is attached. Therefore, it is easier to simplify the structure that allows a work light to enter therein toward the inside of the engine hood so that the work light can be attached.

Therefore, there is an advantage in that it is possible to employ a simple structure that the work light can be easily attached, while reducing the possibility of the work light coming into contact with crops, weeds and the like.

In the above-described configuration, it is preferable that the work light is attached so as to face forward and downward, in an orientation in which the work light does not protrude laterally outward past the lateral side surface.

With the above-described configuration, the work light is attached so as to face forward and downward, in an orientation in which the work light does not protrude laterally outward past the lateral side surface of the engine hood. Therefore, compared with a work light being attached with protruding laterally outward past the lateral side surface of the engine hood, there is an advantage in that the right/left size of the engine hood can be compacter, and that it is easier to avoid contact with another object.

In the above-described configuration, it is preferable that the work light is located on a rear upper portion of the peripheral wall portion, and is provided in an orientation in which the work light faces forward and downward so that a light axis of light emitted from the work light extends along the recessed portion bottom surface.

With the above-described configuration, the work light is located on a rear upper portion of the peripheral wall portion of the recessed portion, and the light axis of light emitted from the work lights is directed forward and downward along a ventilation plate portion.

Therefore, it is possible to provide the recessed portion bottom surface, which does not block the emitted light, over a large area that is forward and downward of the work light that is located on a rear upper portion of the peripheral wall portion of the recessed portion that is recessed from the lateral side surface, and there is an advantage in that light emitted from the work light that is provided on the recessed portion that is recessed from the lateral side surface can be reasonably directed forward and downward.

In the above-described configuration, it is preferable that a depth of the peripheral wall portion in a direction in which the recessed portion is recessed is set such that a depth of a portion of the peripheral wall portion on which the work light is provided is greater than a depth of a portion of the peripheral wall portion that faces the aforementioned portion of the peripheral wall portion in a radial direction of the recessed portion.

With the above-described configuration, a depth of a portion of the peripheral wall portion on which the work light is provided is greater than a depth of a portion of the peripheral wall portion that faces the aforementioned portion in a radial direction of the recessed portion. Therefore, there is an advantage in that it is easier to attach the work light so as not to protrude laterally outward from the lateral side surface, and it is easier to set the work light in an appropriate attachment state.

In the above-described configuration, it is preferable that the recessed portion bottom surface comprises a ventilation grill in which a number of ventilation holes are formed.

According to the above-described configuration, the work light is not provided on the ventilation grill portion in which ventilation holes are provided, but is provided on the peripheral wall portion.

Therefore, there is an advantage in that the work light can be provided in the recessed portion of the front portion of the engine hood, without narrowing the ventilation area of the ventilation grill portion, which is an area that allows for ventilation.

In the above-described configuration it is preferable that the ventilation grill is formed of a ventilation plate member provided separate from the lateral side surface, and that the work light is provided with coupling portions that are detachably attachable to a supporting member for the work light and to the ventilation plate member, respectively.

With the above-described configuration, the work light serves also as a coupling means for coupling the ventilation plate member to the engine hood, and there is also an advantage in that it is easier to attach the ventilation plate member while keeping an appropriate positional relationship with the engine hood and the work light.

Further, a work vehicle according to the invention comprises:
a front axle casing that extends from a transmission side to right and left lateral sides;
a wheel support casing that is coupled to the front axle casing so as to be steerable, using a kingpin that is provided on an extended end portion of the front axle casing; and
a tie rod that is provided forward of the front axle casing,
wherein a coupling shaft that has an axis that is at a distance from an axis of the kingpin is provided so as to stand on the wheel support casing, the tie rod is provided with a boss portion that fits onto the coupling shaft, and the wheel support casing and the tie rod are coupled to each other by the boss portion fitted onto the coupling shaft,
a dustproof boot is attached so as to span the boss portion and the wheel support casing that is located downward of the boss portion, and a boot guard that shields a front side of the dustproof boot is attached to an end portion of the tie rod on which the boss portion is provided.

With the above-described configuration, a boot guard for shielding a front side of a dustproof boot, that is attached to span the boss portion and the wheel support casing located downward of the boss portion, is attached to an end portion of the tie rod on which the boss portion is provided.

Therefore, there is an advantage in which the boot guard is always located forward of the dustproof boot regardless of changes in orientation of the wheel support casing when a steering operation is performed, and it is possible to prevent the dustproof boot from coming into contact with weeds and crops, to thereby improve the durability of the dustproof boot.

In the above-described configuration, it is preferable that a tie rod cover that covers a front portion of the tie rod that has been operated so as to be in a straight travelling state is located forward of the tie rod and the boot guard.

With the above-described configuration, a tie rod cover that covers a front portion of the tie rod in a straight travelling state is located forward of the boot guard, and therefore there is an advantage in that it is possible to avoid interference between the boot guard in a straight travelling state and the tie rod cover, and to provide the boot guard so as to always protect the dustproof boot.

In the above-described configuration, it is preferable that a primary portion of the boot guard is provided so as to be hidden behind the tie rod cover in the straight traveling state, and so as to protrude laterally outward past a laterally outer end portion of the tie rod cover on the side of an axis of a turn upon a front wheel that is attached to the wheel support casing being steered.

With the above-described configuration, a primary portion of the boot guard is hidden behind the tie rod cover in a straight travelling state, and protrudes from an end portion of the tie rod cover when upon a front wheel being steered, and therefore there is an advantage in that the position at which the boot guard is present is also covered by the tie rod cover, and it is easier to prevent the position at which the boot guard in a straight travelling state is present from being entangled with weeds and crops.

In the above-described configuration, it is preferable that a recessed portion for avoiding interference with the wheel support casing is formed in a lower portion of an end portion of the boot guard on the wheel support casing side.

With the above-described configuration, a recessed portion for avoiding interference with the wheel support casing is formed in a lower portion of an end portion of the boot guard on the wheel support casing side, and therefore it is possible to prevent the wheel support casing that is located outside a turning radius when a turn is made from interfering with the boot guard.

Therefore, it is possible to provide boot guards over a wide range so as to be as close as possible to the wheel support casing in a right-left direction, and it is easier to reliably prevent dustproof boots from coming into contact with weeds and crops.

BRIEF DESCRIPTION OF THE DRAWINGS

FIG. 20 is a cross-sectional view showing a position at which power is outputted from a transmission case to a front wheel drive shaft.

EMBODIMENTS OF THE INVENTION

First Embodiment

The following describes an exemplary embodiment of the present invention with reference to the drawings.

Note that a front-rear direction and a right-left direction in the following embodiments are defined as follows unless otherwise specified. That is, a forward travelling direction in which a vehicle body travels to perform an implement work (see arrow F in FIG. 2) is "forward", a rearward travelling direction (see arrow B in FIG. 2) is "rearward", a direction corresponding to the right when the vehicle body is in a forward-facing orientation relative to the above-described front-rear direction (see arrow R in FIG. 2) is "right", and similarly a direction corresponding to the left (see arrow L in FIG. 2) is "left".

Overall Configuration

Figure 1:
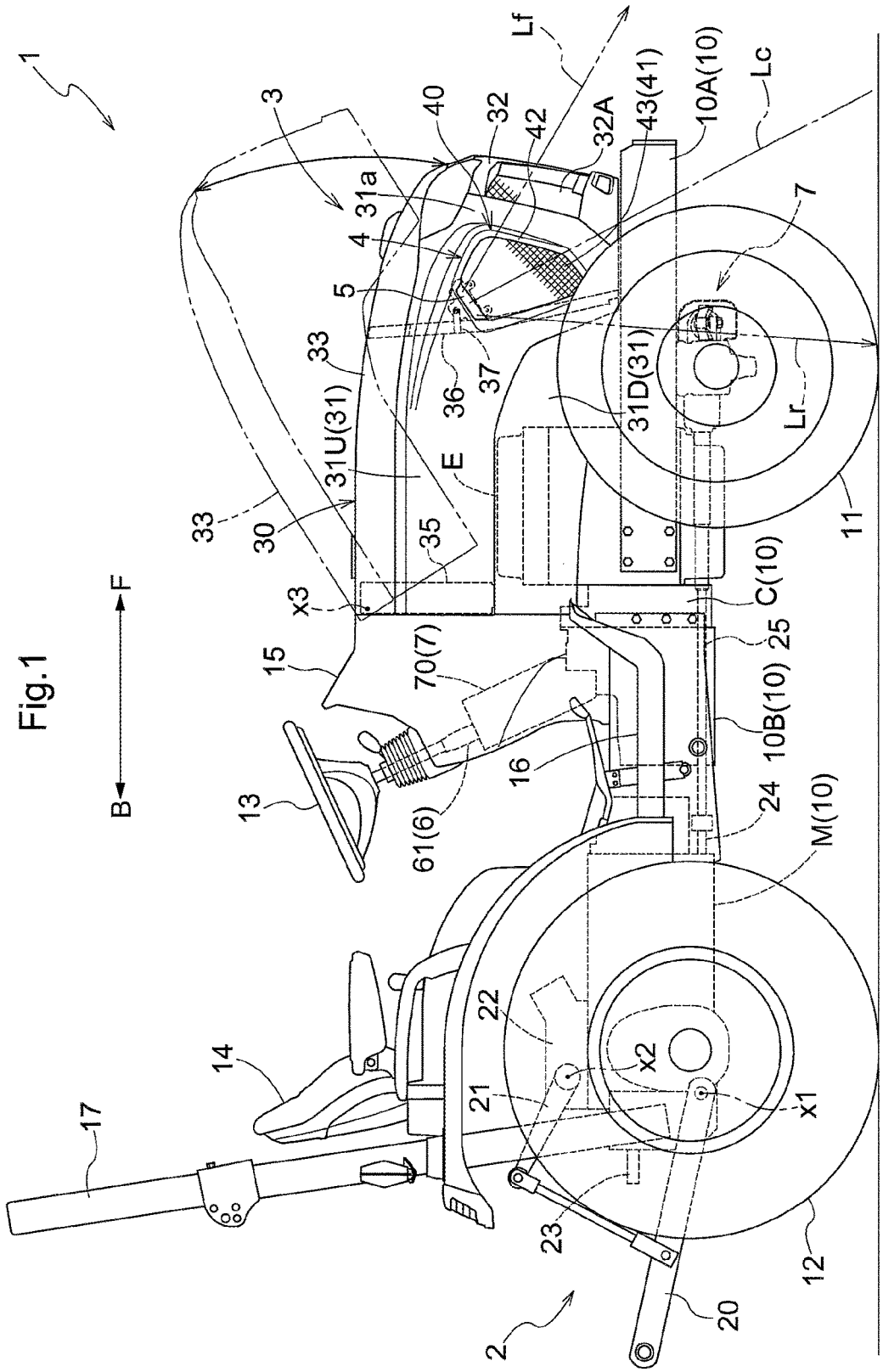
FIG. 1 is an overall side view of a tractor according to a first embodiment (the same applies through to FIG. 10)

FIG. 1 is an overall side view of a tractor, which is an example of a work vehicle according to the present invention.

This tractor includes: a self-propelled vehicle body 1 that is provided with a pair of right and left front wheels 11, which are provided in a front portion of a vehicle body frame 10 so that they may be driven and steerable; and a pair of right and left rear wheels 12, which are provided in a rear portion of the vehicle body frame 10 so that they may be driven, the self-propelled vehicle body 1 thus being configured to travel, and the vehicle body frame 10 is provided with a coupling device 2 for coupling a work implement (not shown) to the tractor.

The vehicle body frame 10 has a monocoque structure in which: an engine mounting frame 10A to which an engine E can be attached; a clutch housing C that is coupled to and integrated with a rear portion of the engine E; a transmission case M in the rear portion; and a power transmission case 10B that couples the clutch housing C and the transmission case M to each other, are coupled to and integrated with each other.

A prime mover part 3 is installed on the vehicle body frame 10, with the engine E being provided in a forward portion of the vehicle body frame 10. A driving part, which includes a steering handle 13 and a driver's seat 14, is provided on the vehicle body frame 10 at a position that is rearward of the prime mover part 3.

On the rear side of the driving part, a ROPS (rollover protection structure) frame 17 is coupled to and fixed to the vehicle body frame 10 so as to be located near the rear end of the driver's seat 14. Also, the above-described coupling device 2, which is configured to lift and lower various kinds of work implements coupled thereto (not shown) such as a rotary cultivation device, is provided on the rear side of the transmission case M constituting a rear portion of the above-described vehicle body frame 10.

The coupling device 2 includes a pair of right and left lower links 20 that are coupled to a lower portion of a rear end portion of the transmission case M so as to be pivotable in the vertical direction about a lateral axis x1, and a pair of right and left lift arms 21 that suspend and pivot the lower links 20 about the lateral axis x1 to lift and lower a work implement. The right and left lift arms 21 are configured to be simultaneously pivotable in the vertical direction about a lateral axis x2, using a single-action type hydraulic cylinder 22 that is provided above the transmission case M.

The coupling device 2 with the above-described configuration is used as a lifting/lowering linkage mechanism that can change or adjust the level of a work implement coupled to thereto, relative to the vehicle body.

A rear PTO (power takeoff) shaft 23 for transmitting the drive power of the above-described engine E to a work implement and so on is provided so as to protrude rearward from a rear end portion of the transmission case M.

Power that is to be transmitted to various kinds of work implements coupled thereto such as the above-described rotary cultivation device is transmitted to the rear PTO shaft 23, and power that is to be transmitted to various kinds of devices that are provided forward of the transmission case M such as a front wheel drive shaft 25 for transmitting power toward the front wheels 11 is transmitted to a mid PTO shaft 24.

Engine Hood

The prime mover part 3 is provided with an engine hood 30 into which a water-cooled type engine E is built.

In addition to the above-described engine E, various kinds of engine-related devices (not shown) such as a radiator, an air cleaner, an oil cooler for cooling hydraulic oil, and a battery are housed in an engine room, which is an internal space of the engine hood 30.

An operation part panel 15 that is provided with the steering handle 13 is provided contiguously with a rear portion of the engine hood 30 so as to be located outside the engine room in which the above-described various kinds of engine-related devices are housed, with a driving part step 16 being interposed between the operation part panel 15 and the driver's seat 14.

The engine hood 30 is provided with a pair of right and left side covers 31 that are fixed to lateral side portions of the engine mounting frame 10A, and a front cover 32 that is fixed to a front portion of the engine mounting frame 10A. The front cover 32 is provided with front grills 32A for ventilation and headlights 34 at positions that are forward of the engine room.

The upper edges of the side covers 31 and the front cover 32 are continuous with a sealing cover 33; and the side covers 31, the front cover 32 and the sealing cover 33 constitute the engine hood 30 that defines the engine room in which the engine E and various kinds of engine-related devices are housed.

The side covers 31 are constituted by respective pairs including lower covers 31D that are respectively located on the right and left sides of the engine room, and upper covers 31U that are provided such that their lower edges overlap the upper edges of the lower covers 31D. Therefore, an outer lateral side surface 31a of each side cover 31, which is provided as a continuous surface formed with a lower cover 31D and an upper cover 31U, constitutes a lateral side surface of the engine hood 30.

Lower end portions of the lower covers 31D of the side covers 31 are fixed to the engine mounting frame 10A, and to a rear frame 35 which will be described later.

The upper covers 31U of the side covers 31 are formed integrally with the front cover 32 and the sealing cover 33 as described above, and are configured such that the front ends thereof are pivotable about a rear lateral axis x3 in the vertical direction as indicated by an imaginary line in FIG. 1. Therefore, a portion of the engine hood 30 into which the upper covers 31U, the front cover 32 and the sealing cover 33 are integrated is configured to be pivotable about the above-described lateral axis x3 independently of the above-described lower covers 31D.

The lower covers 31D are shorter than the upper covers 31U in the front-rear direction, and are located on the rear side so as to face lateral sides of the engine E that is located on the rear side in the engine room. The upper covers 31U are longer than the lower covers 31D in the front-rear direction, and extend forward past the front ends of the lower covers 31D. The upper covers 31U are formed as members that are separate from the lower covers 31D.

Vertically-elongated ventilation opening portions 4 (corresponding to the recessed portion) are formed in the upper covers 31U, at positions that are located between the front ends of the lower covers 31D and the rear end of the front cover 32.

The rear frame 35 that has an arch shape stands on the rear end of the engine hood 30, with the right and left lower end portions of the rear frame 35 being fixed to the engine mounting frame 10A. The rear end portion of the above-described sealing cover 33 is pivotally coupled to the upper end portion of the rear frame 35 so as to be pivotable about the above-described lateral axis x3.

Figure 7:
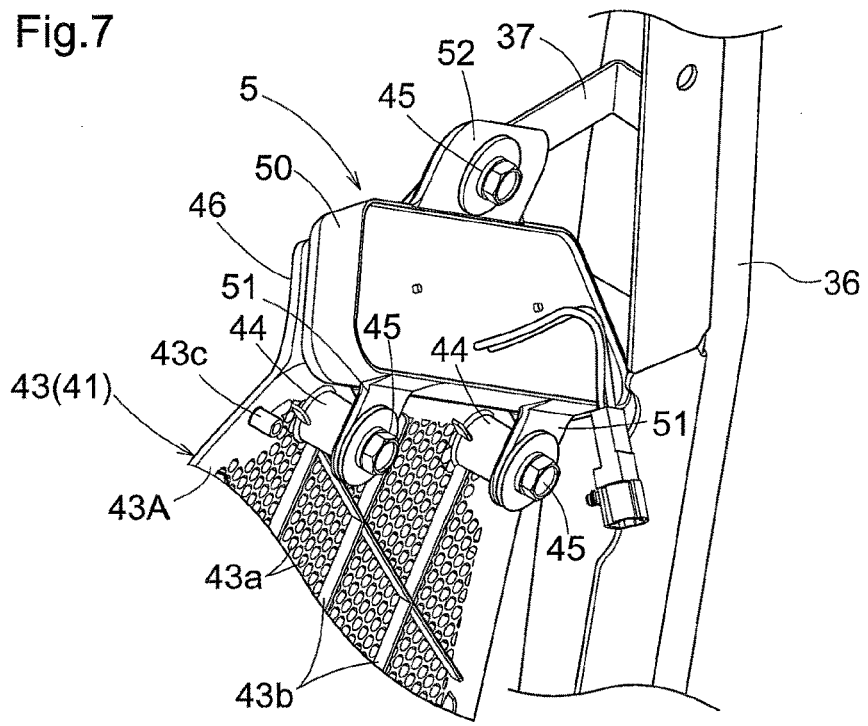
FIG. 7 is a perspective view showing how the ventilation plate portion, the work light and a front supporting frame are coupled to each other.

Also, a front frame 36 (see FIGS. 1 and 7), which has an arch shape and is lower than the rear frame 35, is provided on the inner surface of a front portion of the engine hood 30, integrally with the upper covers 31U and the sealing cover 33.

This front frame 36 has an arch shape and thereby supports the engine hood 30 from the inside, and the lower end portion thereof is mounted on and supported by the engine mounting frame 10A so that the weight of the engine hood 30 is supported by the engine mounting frame 10A.

Ventilation Opening Portions

The ventilation opening portions 4, which are recessed portions formed in the side covers 31, are configured as follows.

Figure 4:
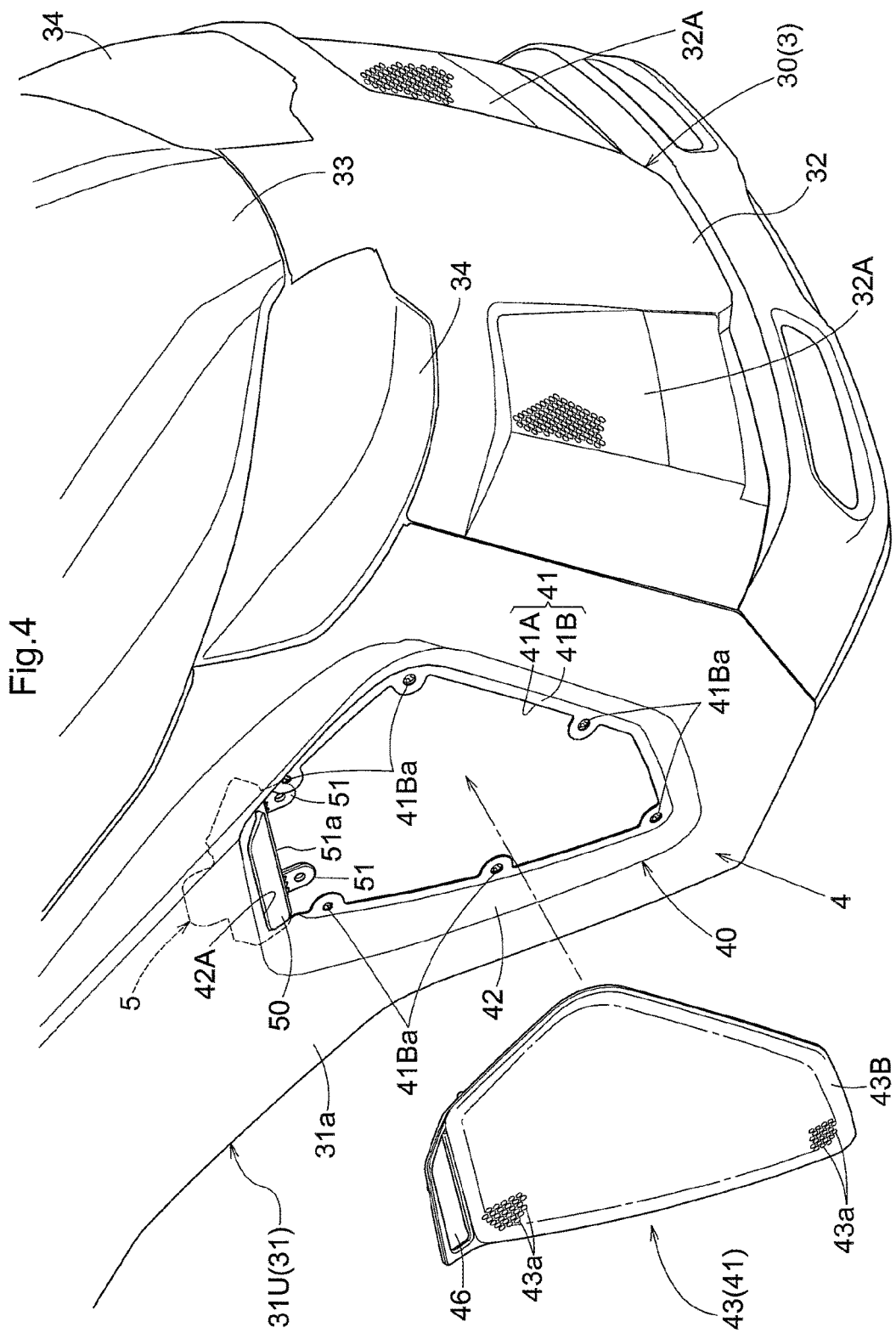
FIG. 4 is an exploded perspective view showing a ventilation opening portion in a front portion of an engine hood.
Figure 5:
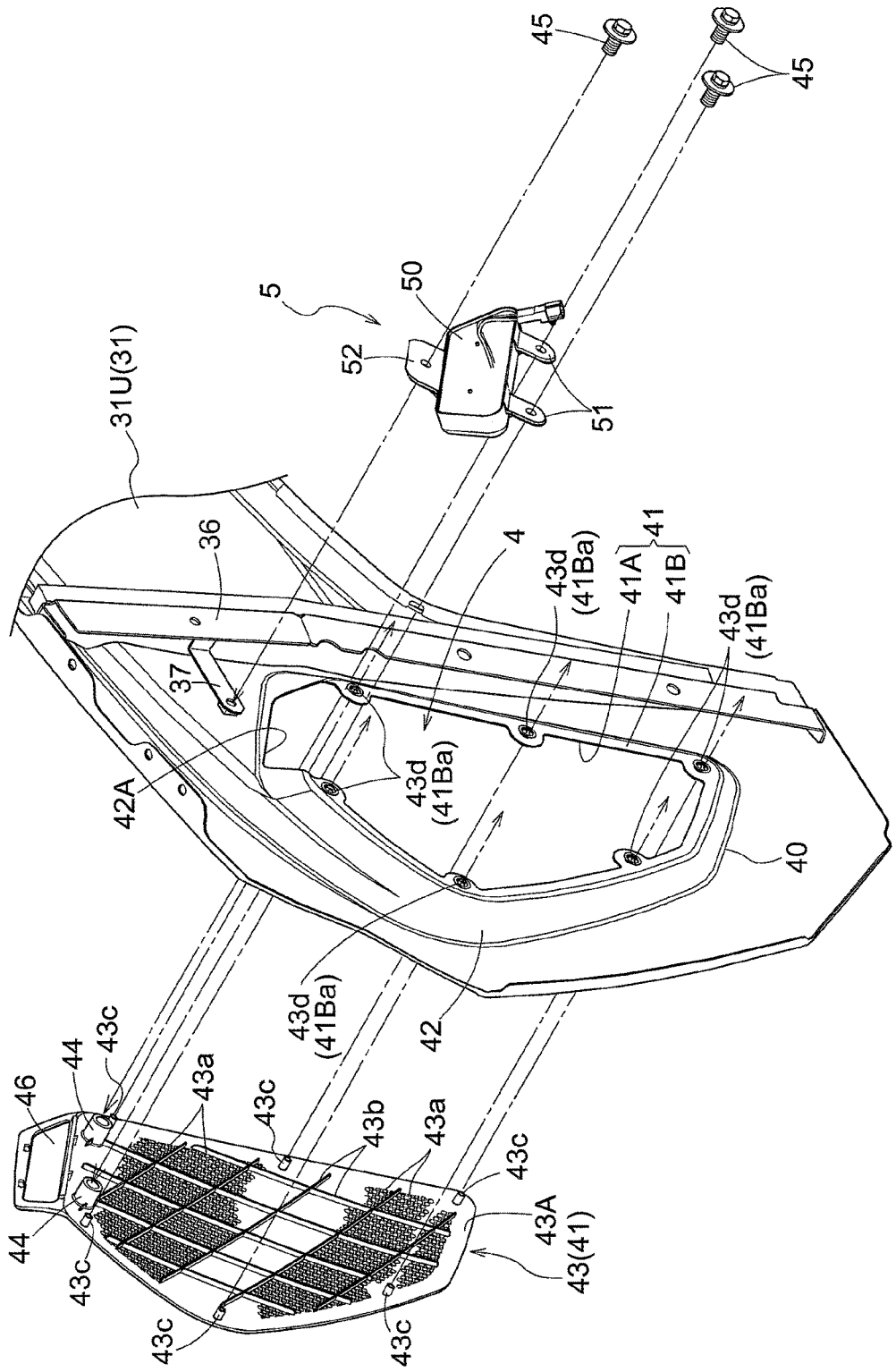
FIG. 5 is an exploded perspective view showing a position to which a ventilation plate portion and a work light are attached, viewed from the inside of the engine hood.
Figure 6:
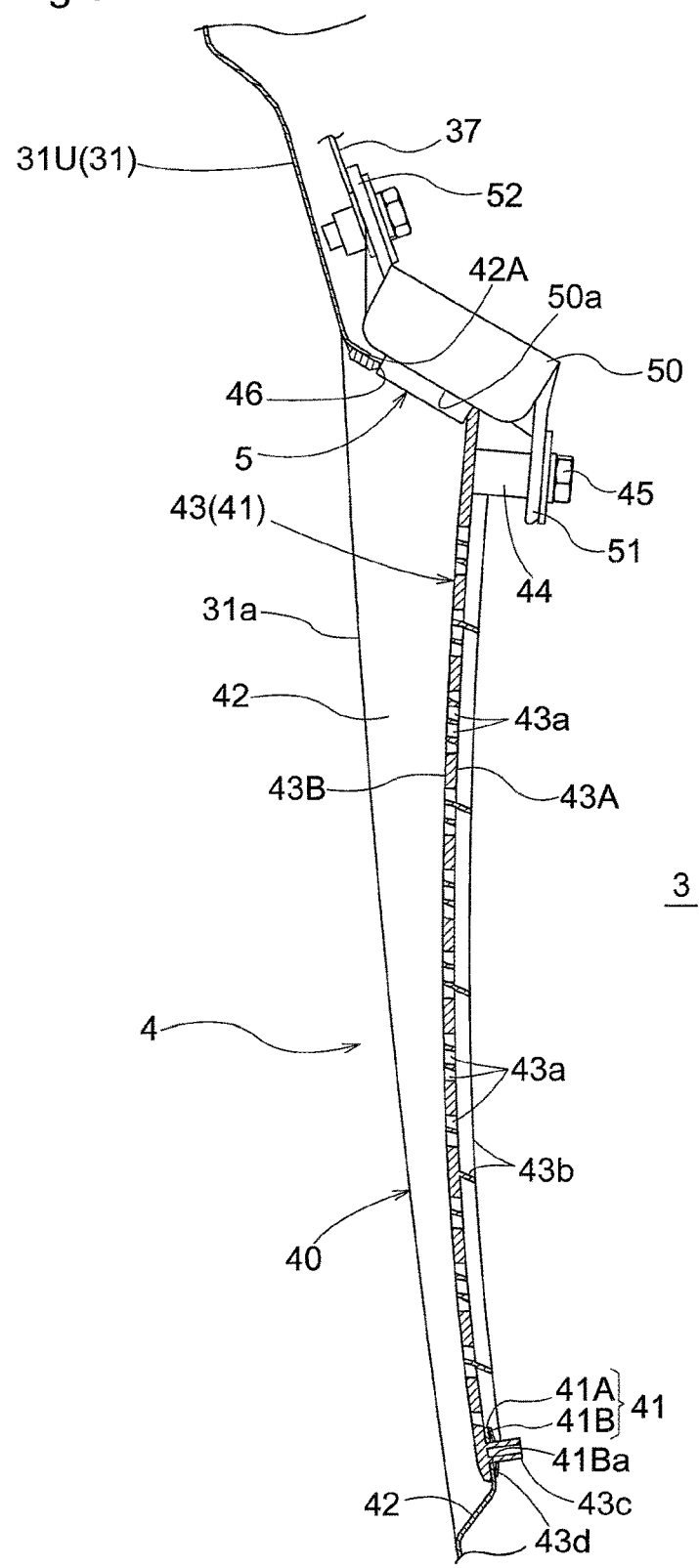
FIG. 6 is a cross-sectional view showing how the ventilation plate portion and the work light are attached to the ventilation opening portion.

As shown in FIGS. 4 to 6, portions of the outer lateral side surfaces 31a (corresponding to the lateral side surface) of the upper covers 31U of the side covers 31 are formed so as to be recessed toward the inside of the engine hood 30, and these recessed portions constitute the ventilation opening portions 4.

Specifically, as shown in FIGS. 4 to 6, portions of the upper covers 31U that are made from plate metals are formed so as to be recessed from the lateral outside toward the inside of the engine hood 30, using pressing and punching processing. Therefore, recessed portion inlet openings 40, which are open toward the lateral outside of the engine hood 30, are formed in areas of the ventilation opening portions 4 that are flush with the outer lateral side surfaces 31a of the upper covers 31U. Also, recessed portion bottom surfaces 41 are formed at the deepest positions of the ventilation opening portions 4 that are recessed from the recessed portion inlet openings 40 toward the inside of the engine hood 30.

The ventilation opening portions 4 include peripheral wall portions 42 that are provided so as to span the peripheral edges of the recessed portion bottom surfaces 41 and the peripheral edges of the recessed portion inlet openings 40 that are located laterally outward of the recessed portion bottom surfaces 41.

Communication openings 41A that penetrate through the recessed portion bottom surfaces 41 and allow the internal space of the engine hood 30 to communicate with the outside are provided in the recessed portion bottom surfaces 41. These communication openings 41A are formed as openings that have an area that is smaller than an entire recessed portion bottom surface 41 so that small-width peripheral portion connection pieces 41B remain along the peripheral edges of the recessed portion bottom surfaces 41.

Ventilation plate members 43, each with the same shape and size as those of the recessed portion bottom surfaces 41, are placed on and attached to the outside of the peripheral portion connection pieces 41B, and thus the recessed portion bottom surfaces 41 are constituted by the ventilation plate members 43, the communication openings 41A and the peripheral portion connection pieces 41B.

The ventilation plate members 43 are formed as grills that are molded members made of synthetic resin and are each provided with a number of ventilation holes 43a so as to allow air to flow into and out of the engine hood 30.

As shown in FIGS. 4 to 6, each of the ventilation plate members 43 substantially has a flat plate shape overall. Technically, however, areas thereof corresponding to substantially central portions of the ventilation opening portions 4 are each curved so as to form a spherical surface that slightly bulges laterally outward compared with an area near the periphery. This configuration increases rigidity in a direction that intersects the plate surfaces, compared with when completely flat plate members are employed.

Also, grid-shaped ribs 43b are formed integrally with inwardly facing surfaces 43A of the ventilation plate members 43, which face toward the inside of the engine room, and these ribs 43b further increase the rigidity of the ventilation plate members 43.

As shown in FIG. 5, stopper pins 43c are formed integrally with the inwardly facing surface 43A of each ventilation plate member 43, respectively at six positions near the outer periphery thereof. As shown in FIGS. 4 to 6, these stopper pins 43c are formed so that they may be inserted into and removed from coupling holes 41Ba of the peripheral portion connection pieces 41B that are formed in the peripheries of the recessed portion bottom surfaces 41 of the ventilation opening portions 4. Stopper metal parts 43d are attached to the stopper pins 43c that protrude toward the engine room, with the stopper pins 43c being inserted into the coupling holes 41Ba, and thus the ventilation plate members 43 may be fixed in position on respective inner sides of the ventilation opening portions 4 of the upper covers 31U.

Also, bolt attachment portions 44 are formed integrally with the inwardly facing surface 43A of each ventilation plate member 43, respectively at two positions on an upper rear portion of the inwardly facing surface 43A. These bolt attachment portions 44 are cylindrical portions that are provided with internal female screw portions (not shown), and the female screw portions are formed so as to allow coupling bolts 45 to be screwed thereinto such that the bolt attachment portions 44 can be attached to front attachment arms 51 (corresponding to the coupling portions) of work lights 5, which will be described later, by using the coupling bolts 45.

Work light insertion portions 46 that can be fitted to positioning step portions 50a of the work lights 5, which will be described later, are formed integrally with the ventilation plate members 43, respectively at rear upper positions thereof.

The work light insertion portions 46 are bent laterally outward past outwardly facing surfaces 43B of the ventilation plate members 43, and configured to allow the work lights 5 to be attached thereto in a standing orientation so as to intersect the outwardly facing surfaces 43B of the ventilation plate members 43.

Portions of the peripheral wall portions 42 corresponding to rear upper portions of the ventilation opening portions 4 are cut out so as to be continuous with the communication openings 41A formed in the recessed portion bottom surfaces 41. These cutout portions constitute fitting recessed portions 42A to which the work lights 5 are fitted. At portions of the peripheral wall portions 42 where the fitting recessed portions 42A are formed, the depth of the peripheral wall portions 42 in the direction in which the ventilation opening portions 4 are recessed is made larger than the depth of another portions of the peripheral wall portions 42 that face the former portions in the radial direction of the recessed portion inlet openings 40.

Work Lights

The work lights 5 that are attached to the work light insertion portions 46 are configured as follows.

The work lights 5 are provided independently of the headlights 34 that are provided at forward positions of the engine hood 30. The work lights 5 are provided to emit light forward and downward, particularly to an area that is just in front of the front wheels 11 so that the area just in front of the front wheels 11 of the self-propelled vehicle body 1 can be easily seen, and are constituted by LED (light-emitting diode) lamps.

Figure 8:
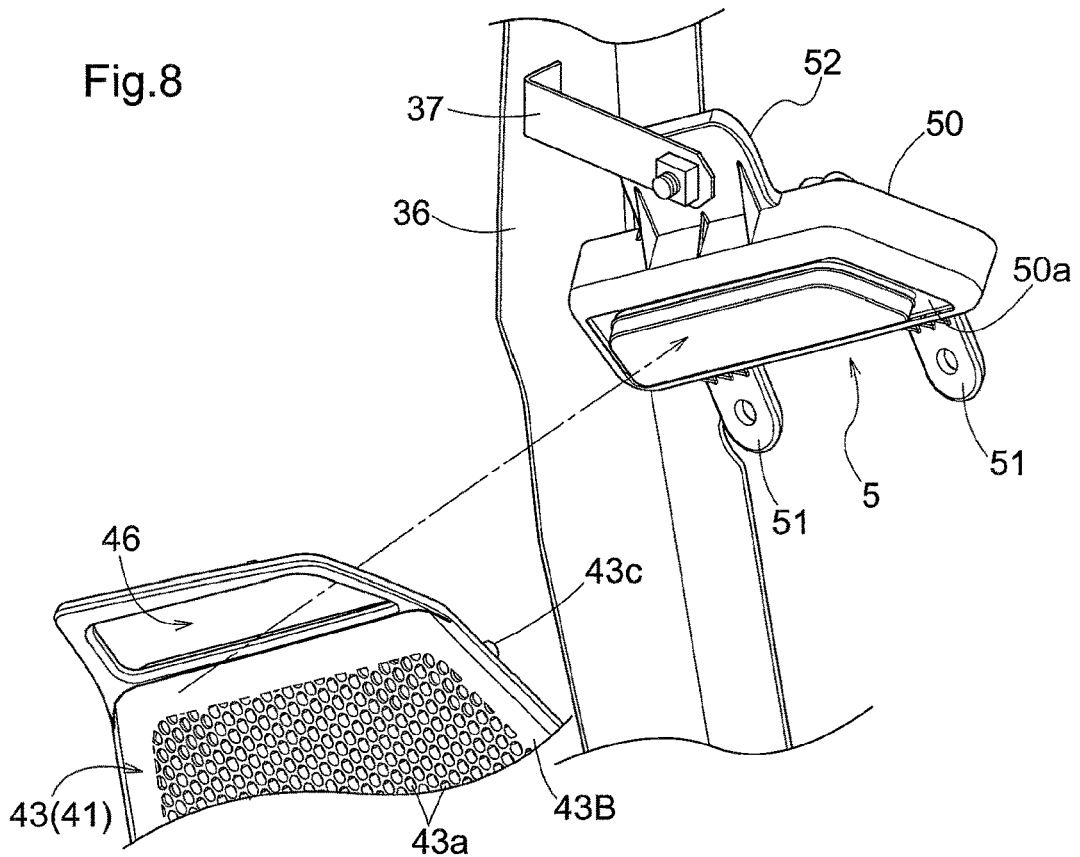
FIG. 8 is an exploded perspective view showing how the ventilation plate portion, the work light and the front supporting frame are coupled to each other.

In the work lights 5, as shown in FIGS. 6 and 8, step portions 50a are formed on the front surfaces of light bodies 50, near the outer peripheries thereof, along the entire length of the peripheries. The step portions 50a are formed such that the front portions of the step portions 50a can be inserted into and fitted to the fitting recessed portions 42A of the above-described peripheral wall portions 42 and the work light insertion portions 46 of the ventilation plate members 43 from the inside of the engine hood 30.

At this time, as shown in FIG. 6, portions of the upper covers 31U near the fitting recessed portions 42A of the peripheral wall portions 42 are located between front portions of the light bodies 50 and the work light insertion portions 46 of the ventilation plate members 43.

The light bodies 50 of the work lights 5 each includes two front attachment arms 51 that extend forward and downward, and one rear attachment arm 52 (corresponding to a coupling portion) that extends rearward in an upward direction.

The front attachment arms 51 are coupled and fixed to stopper bolt attachment portions 43e that are respectively located at two positions on an upper rear portion of a ventilation plate member 43, using coupling bolts 45.

The rear attachment arm 52 is attached to an intermediate portion on the front frame 36 using an attachment stay 37, which frame 36 is provided on the inner surface of the engine hood 30. That is, the front frames 36 and the attachment stays 37 are used as supporting members for the work lights 5. Upper portions of the work lights 5 are coupled to these supporting members, and upper portions of the ventilation plate members 43 that are coupled to the work lights 5 are also supported by the supporting members.

Figure 2:
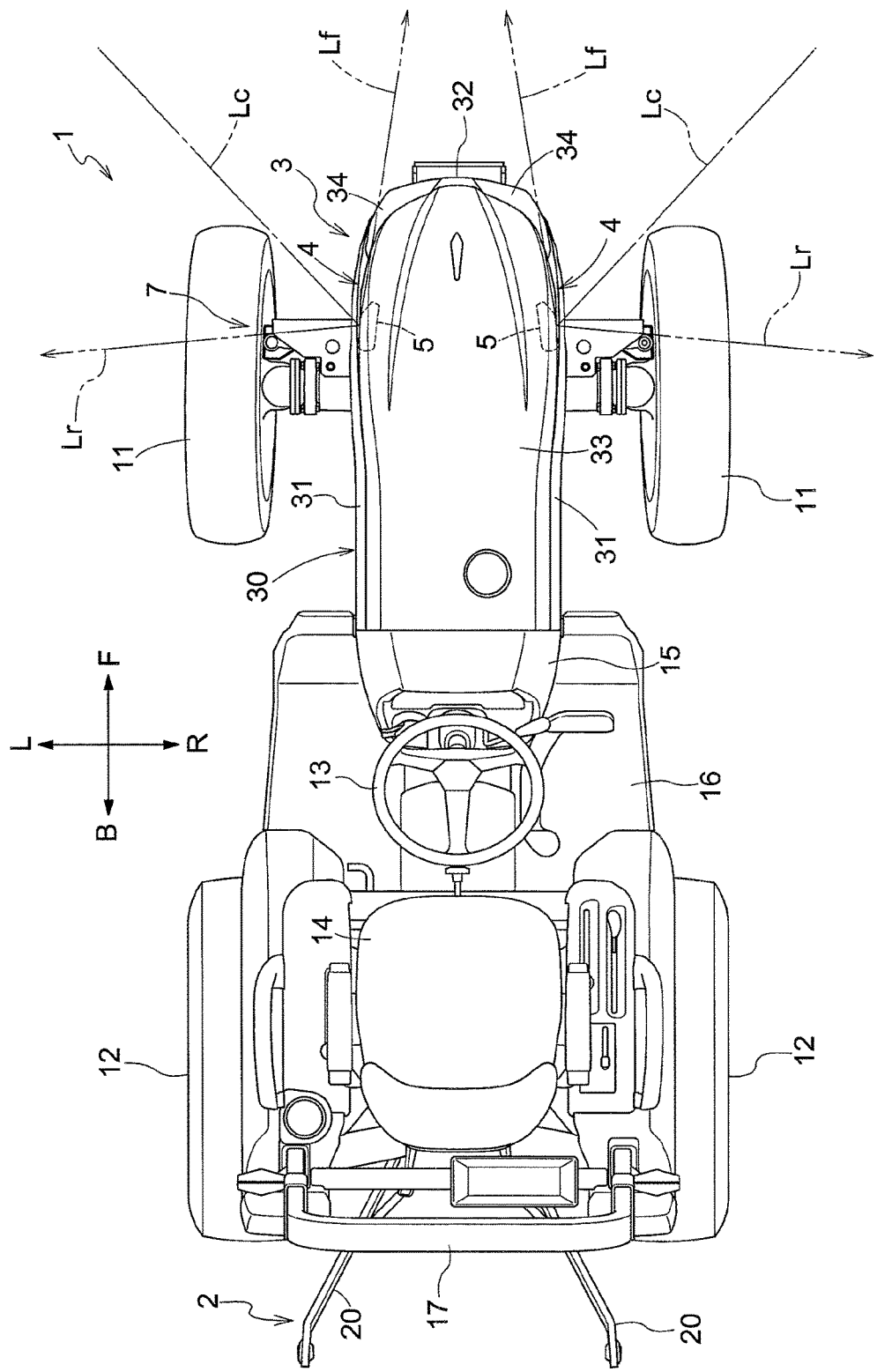
FIG. 2 is an overall plan view of the tractor.
Figure 3:
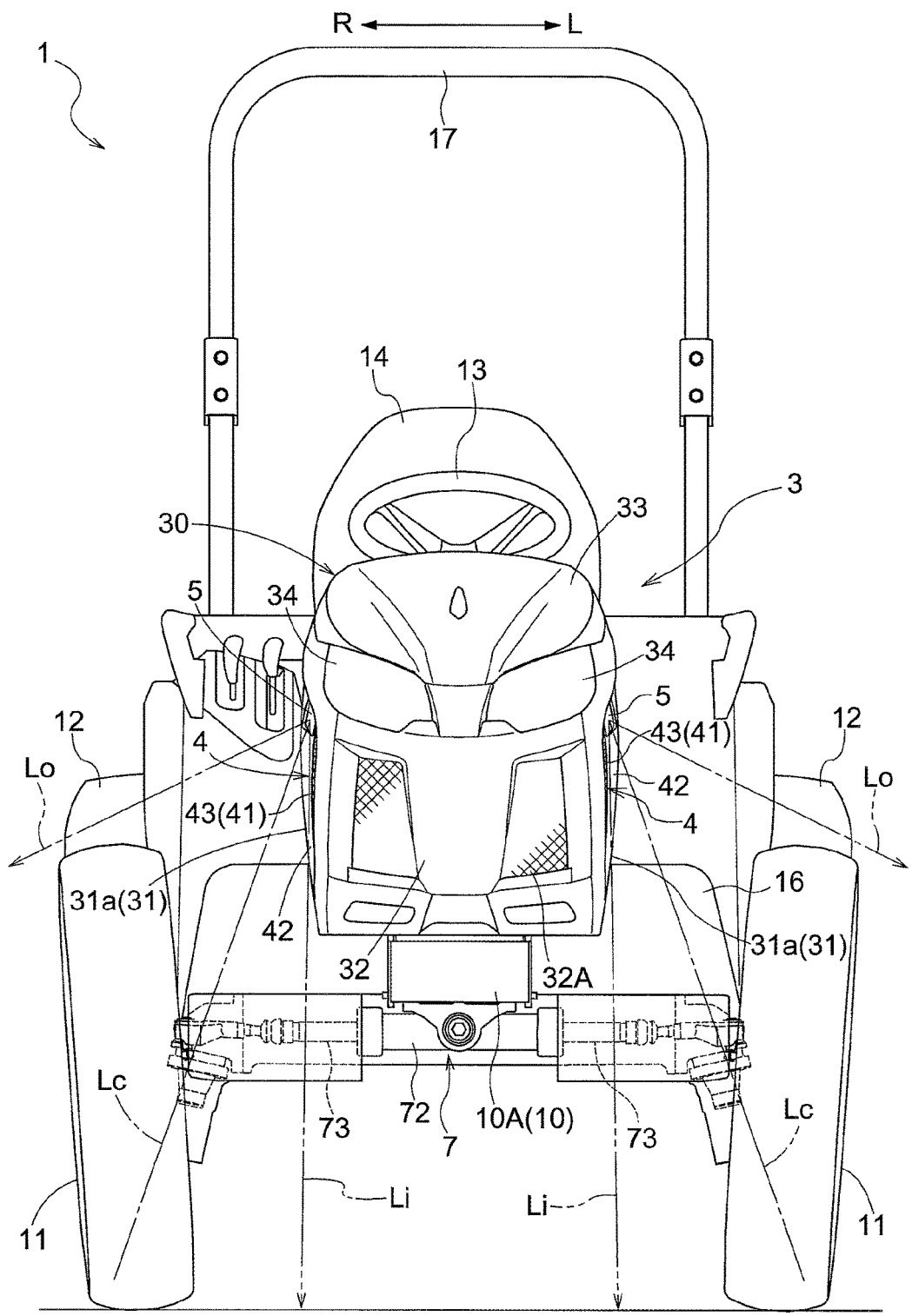
FIG. 3 is an overall front view of the tractor.

After the work lights 5 are attached as described above, light axes L0 of the work lights 5 face forward and downward as shown in FIGS. 1 to 3.

Specifically, in side view and plan view as shown in FIGS. 1 and 2, respectively, light axes Lc are directed toward positions that are close to positions just in front of the front wheels 11 in a straight-travelling state such that irradiation ranges span from positions that are close to the ground-engaging points of the front wheels 11, to positions that are just in front of the travelling vehicle body. At this time, rear end positions Lr of the irradiation ranges are directed to positions that are close to the ground-engaging points of the front wheels 11, and front end positions Lf of the irradiation range are directed to positions that are significantly forward of the front wheels 11.

Also, in front view as shown in FIG. 3, the light axes Lc are directed toward positions that are outside the positions through which the front wheels 11 in a straight-travelling state are expected to pass, such that the irradiation ranges span from positions that are close to positions right below the outer lateral side surfaces 31a of the engine hood 30 that are inward of the vehicle body relative to the front wheels 11, to positions that are laterally outward of the front wheels 11.

At this time, inner end positions Li of the irradiation ranges are directed to positions that are close to positions inward of the ground-engaging points of the front wheels 11 and right below the outer lateral side surfaces 31a of the engine hood 30, and outer end positions Lo of the irradiation ranges are directed to positions that are significantly outward of the front wheels 11 in a lateral direction.

Steering Shaft Supporting Structure

The structure of a steering shaft 6 in the driving part, where the steering handle 13 is attached to an upper end portion of the steering shaft 6, will be described next.

Figure 9:
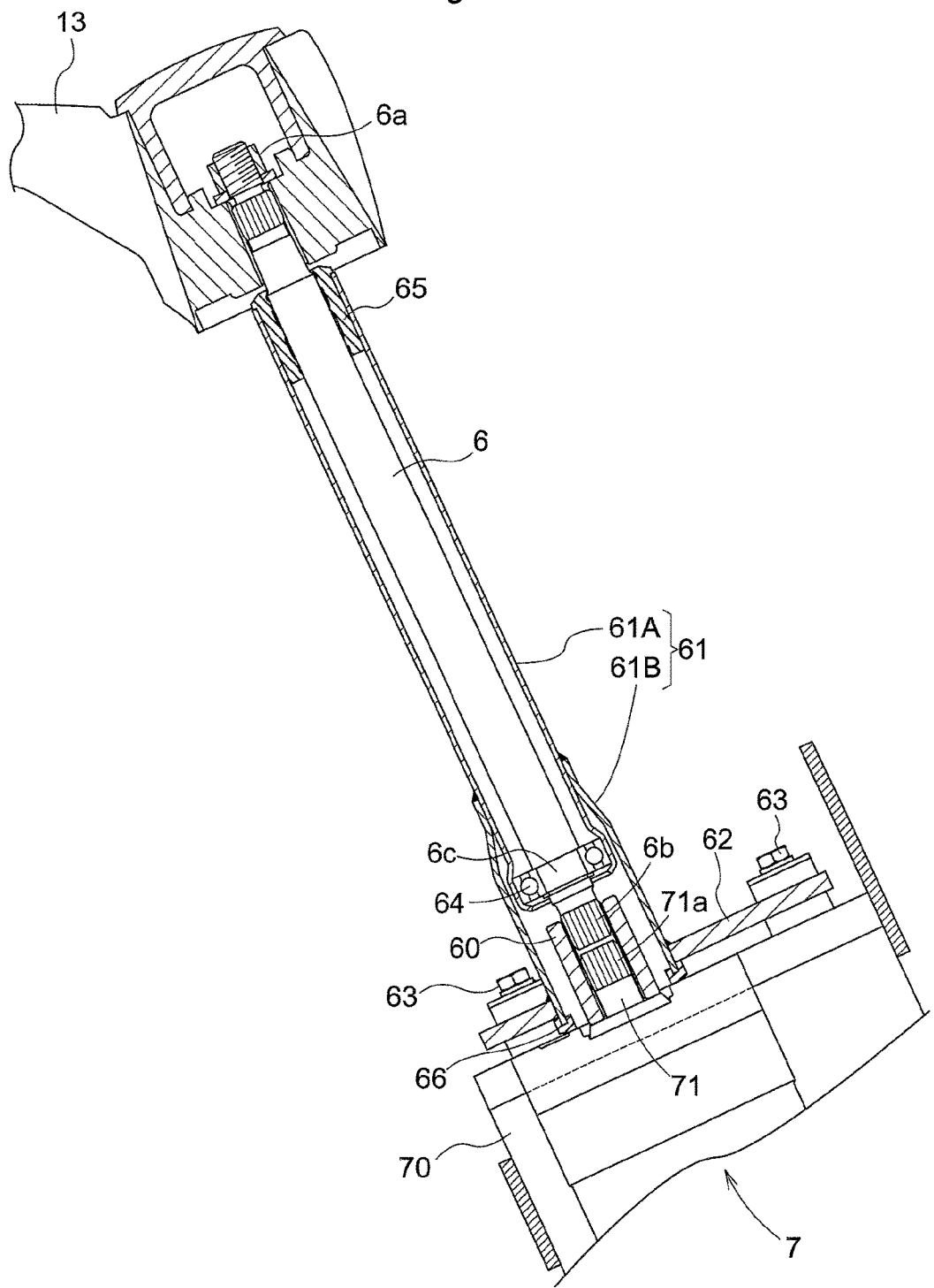
FIG. 9 is a cross-sectional view showing a structure for supporting a steering shaft.

As shown in FIG. 9, the steering shaft 6 is configured to transmit rotation of the steering handle 13 to a manual operation type steering mechanism 7.

The steering mechanism 7 is provided with an operation input shaft 71 that is located on the upper surface of an operation box 70, and is configured to cause a steering hydraulic cylinder 72 to expand and contract in response to the operation input shaft 71 being rotated, and to move tie rods 73 (see FIG. 3) in the right-left direction and steer the front wheels 11.

An upper end portion of the steering shaft 6 is fixed to the steering handle 13 using spline fitting and a stopper nut 6a, such that the steering shaft 6 rotates integrally with the steering handle 13.

A lower end portion of the steering shaft 6 abuts against the operation input shaft 71 that protrudes upward from the upper surface of the operation box 70, and is concentrically coupled to the operation input shaft 71 by a coupler 60. Specifically, a lower end portion of the steering shaft 6 and the operation input shaft 71 are respectively provided with spline portions 6b, 71a that are engaged with an inner spline that is formed on the inner circumferential surface of the coupler 60, and are fitted and coupled so as to be relatively movable in an axial direction of the coupler 60 and rotate integrally with each other.

A steering post 61 that is fitted onto the steering shaft 6 includes a straight pipe portion 61A that has a round pipe shape, an outer tube portion 61B that has a tubular shape and is fixed by welding to a lower end portion of the outer tube portion 61A so as to be fitted thereonto, and an attachment substrate 62 that has a plate shape and is fixed by welding to a lower end portion of the outer tube portion 61B. The attachment substrate 62 is coupled and fixed to the upper surface of the operation box 70 using coupling bolts 63, and thus the steering post 61 is attached to the upper surface of the operation box 70 so as to stand thereon.

A small-diameter step portion 6c of the steering shaft 6 on the lower end side is rotatably supported on a lower end portion of the straight pipe portion 61A with a ball bearing 64 being interposed therebetween, and is rotatably supported by a rubber bush 65 near an upper end portion of the straight pipe portion 61A.

Also, a sealing member 66 is sandwiched between the lower end of the outer tube portion 61B of the steering post 61 and the upper surface of the operation box 70.

Thus, a small assembly error that may occur when the steering handle 13 and the steering mechanism 7 are attached to each other is permissible in the axial direction of the steering shaft 6 due to the relative movement of the coupler 60 and the steering shaft 6, and is permissible in the radial direction of the steering shaft 6 due to the elastic deformation of the rubber bush 65. Therefore, it is possible to simplify the attachment structure and reduce the number of steps for assembly.

Another Embodiment 1

In the foregoing embodiment, as the recessed portions for installing the work lights 5, the ventilation opening portions 4 are recessed toward the inside of the engine hood 30. However, the recessed portions are not limited in such a way.

Figure 10:
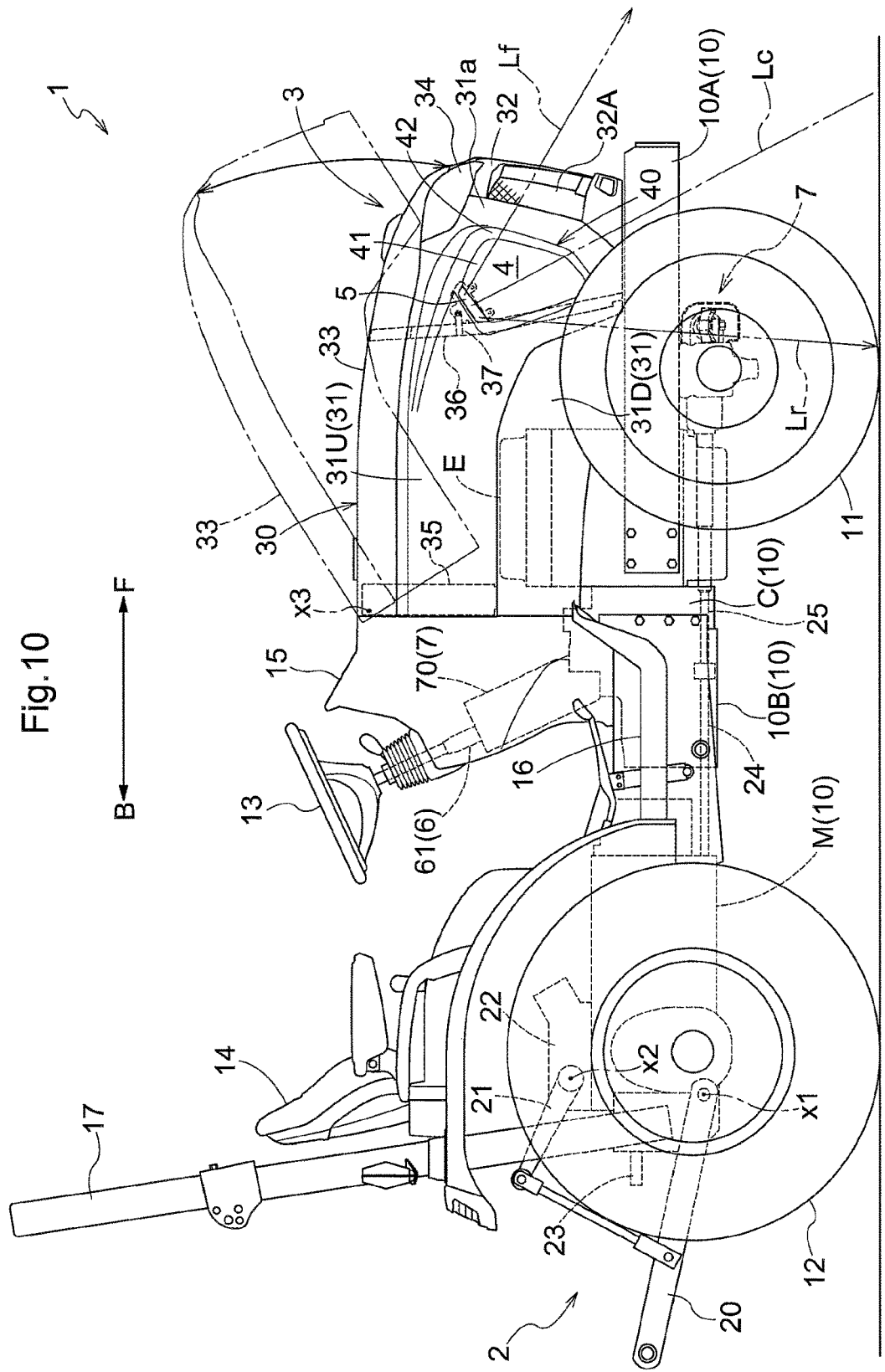
FIG. 10 is an overall side view of a tractor according to another embodiment.

For example, as indicated by reference numeral 4 in FIG. 10, holeless recessed portions may be formed in the outer lateral side surfaces 31a of the upper covers 31U of the engine hood 30, and the work lights 5 may be installed on upper portions of the holeless recessed portions.

If this is the case, the work lights 5 may be fitted from the inside or outside of the engine hood 30, into the peripheral wall portions 42 that span the peripheral edges of the recessed portion bottom surfaces 41 of the holeless recessed portions and the recessed portion inlet openings 40 of the outer lateral side surfaces 31a of the upper covers 31U; and thus the work lights 5 may be attached to the recessed portions.

Regarding other configurations, the same configurations as those in the foregoing embodiment may be employed.

Another Embodiment 2

In the foregoing embodiment, the ventilation plate member 43 of each ventilation opening portion 4 is curved to form a spherical surface, in which an area that corresponds to a substantially central area of the ventilation opening portion 4 slightly bulges laterally outward compared with an area near the periphery. However, such a structure is not limitative.

Instead thereof, the ventilation plate members 43 may be configured as a completely flat surface, or a curved surface that has a larger curvature, for example. The same applies to an area corresponding to the recessed portion bottom surface 41, of a holeless recessed portion that is not provided with a ventilation plate member 43.

Regarding other configurations, the same configurations as those in the foregoing embodiment may be employed.

Another Embodiment 3

In the foregoing embodiment, the ventilation opening portions 4 are provided with the recessed portion bottom surfaces 41 that are constituted by the removable ventilation plate members 43, where the ventilation plate members 43 are separate from the peripheral wall portions 42 that are integrated with the engine hood 30.

However, such a structure is not limitative.

For example, although not shown in the drawings, the ventilation opening portions 4 may be provided with recessed portion bottom surfaces 41 that are integrated with and continuous with the peripheral wall portions 42 integrated with the engine hood 30, and may thus constitute grills with the ventilation holes 43a being provided in the recessed portion bottom surfaces 41.

Regarding other configurations, the same configurations as those in the foregoing embodiment may be employed.

Another Embodiment 4

In the foregoing embodiment, the ventilation plate members 43 are grills made of synthetic resin, and provided separate from the peripheral wall portions 42 and are removable. However, this is not essential and the ventilation plate members 43 may be a perforated metal sheet, for example.

Regarding other configurations, the same configurations as those in the foregoing embodiment may be employed.

Another Embodiment 5

In the foregoing embodiment, the work lights 5 are LED (light-emitting diode) lamps. However, this is not essential, and appropriate light emitters such as incandescent bulbs may be employed.

Regarding other configurations, the same configurations as those in the foregoing embodiment may be employed.

Second Embodiment

The following describes an exemplary embodiment of the present invention with reference to the drawings.

Note that a front-rear direction and a right-left direction in the following embodiments are defined as follows unless otherwise specified. That is, a forward travelling direction in which a vehicle body travels to perform an implement work (see arrow F in FIG. 12) is "forward", a rearward travelling direction (see arrow B in FIG. 12) is "rearward", a direction corresponding to the right when vehicle body is in a forward-facing orientation relative to the above-described front-rear direction (see arrow R in FIG. 12) is "right", and a direction similarly corresponding to the left (see arrow L in FIG. 12) is "left".

Overall Configuration

Figure 11:
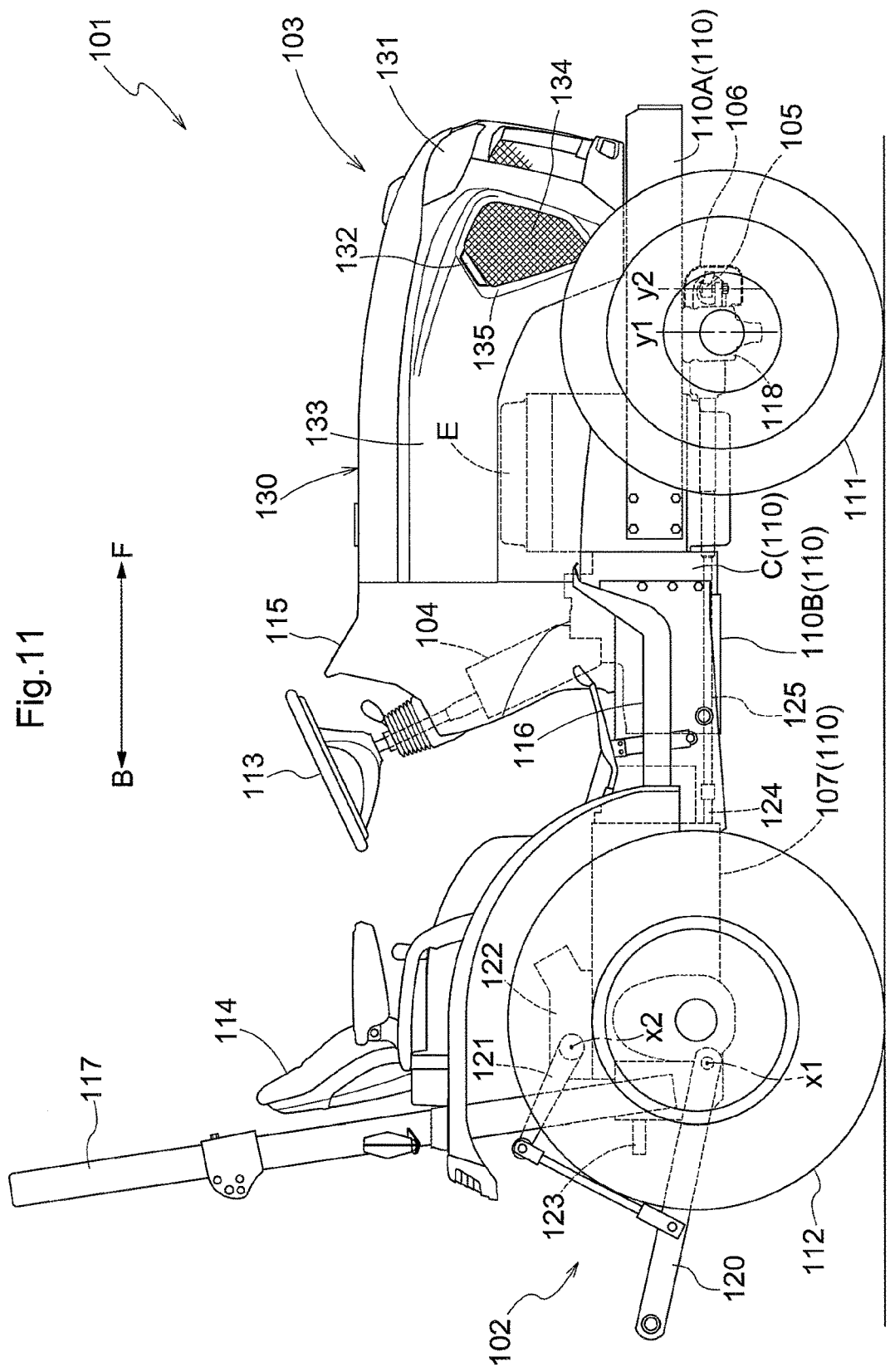
FIG. 11 is an overall side view of a tractor according to a second embodiment (the same applies through to FIG. 20)

FIG. 11 is an overall side view of a tractor, which is an example of a work vehicle according to the present invention.

This tractor includes: a self-propelled vehicle body 101 that is provided with a pair of right and left front wheels 111, which are provided for a front portion of a vehicle body frame 110 so that they may be driven and steerable; and a pair of right and left rear wheels 112, which are provided for a rear portion of the vehicle body frame 110 so that they may be driven, and the vehicle body frame 110 is provided with a coupling device 102 for coupling a work implement (not shown) to the tractor.

The vehicle body frame 110 has a monocoque structure in which: an engine mounting frame 110A to which an engine E can be attached; a clutch housing C that is coupled to and integrated with a rear portion of the engine E; a transmission case 107 in the rear portion; and a power transmission case 110B that couples the clutch housing C and the transmission case 107 to each other, are coupled to and integrated with each other.

A prime mover part 103 is installed on the vehicle body frame 110, with the engine E being provided in a forward portion of the vehicle body frame 110. A driving part, which includes a steering handle 113 and a driver's seat 114, is provided on the vehicle body frame 110 at a position that is rearward of the prime mover part 103.

On the rear side of the driving part, a ROPS (rollover protection structure) frame 117 is coupled to and fixed to the vehicle body frame 110 so as to be located near the rear end of the driver's seat 114. Also, the above-described coupling device 102, which is configured to lift and lower various kinds of work implements coupled thereto (not shown) such as a rotary cultivation device, is provided on the rear side of the transmission case 107 constituting a rear portion of the above-described vehicle body frame 110.

The coupling device 102 includes a pair of right and left lower links 120 that are coupled to a lower portion of a rear end portion of the transmission case 107 so as to be pivotable in the vertical direction about a lateral axis x1, and a pair of right and left lift arms 121 that suspend and pivot the lower links 120 about the lateral axis x1 to lift and lower a work implement. The right and left lift arms 121 are configured to be simultaneously pivotable in the vertical direction about a lateral axis x2, using a single-action type hydraulic cylinder 122 that is provided above the transmission case 107.

The coupling device 102 with the above-described configuration is used as a lifting/lowering linkage mechanism that can change or adjust the level of a work implement coupled to thereto, relative to the vehicle body.

A rear PTO (power takeoff) shaft 123 for transmitting the drive power of the above-described engine E to a work implement and so on is provided so as to protrude rearward from a rear end portion of the transmission case 107.

Power that is to be transmitted to various kinds of work implements coupled thereto such as the above-described rotary cultivation device is transmitted to the rear PTO shaft 123, and power that is to be transmitted to various kinds of devices that are provided forward of the transmission case 107 such as a front wheel drive shaft 125 for transmitting power toward the front wheels 111 is transmitted to a mid PTO shaft 124.

The prime mover part 103 is provided with an engine hood 130 into which a water-cooled type engine E is built.

In addition to the above-described engine E, various kinds of engine-related devices (not shown) such as a radiator, an air cleaner, an oil cooler for cooling hydraulic oil, and a battery are housed in an engine room, which is an internal space of the engine hood 130.

An operation part panel 115 that is provided with the steering handle 113 is provided contiguously with a rear portion of the engine hood 130 so as to be located outside the engine room in which the above-described various kinds of engine-related devices are housed, with a driving part step 116 being interposed between the operation part panel 115 and the driver's seat 114.

Headlights 131 are provided on the front portion of the engine hood 130, and work lights 132 that emit light forward and downward of the travelling vehicle body are provided on lateral side surfaces 133 that are close to the front portion. These work lights 132 are provided on portions of peripheral wall portions 135 of ventilation opening portions 134 that are formed by denting portions of the lateral side surfaces 133, such that the work lights 132 do not protrude outward past the lateral side surfaces 133. Grills that are provided with a number of ventilation holes are attached to the ventilation opening portions 134, and the work lights 132 are constituted by LED (light-emitting diode) lamps.

Front Wheel Steering Mechanism

A power steering mechanism 104 is provided inside the operation part panel 115 for causing a power steering cylinder 140, which will be described later, to expand/contract to steer the front wheels 111.

As shown in FIGS. 13 to 16, the power steering mechanism 104 is configured to supply/drain pressure oil to/from the power steering cylinder 140 which is provided forward of a front axle casing 118, in response to the steering handle 113 being operated, to steer the front wheels 111, and the power steering mechanism 104 is constituted by a total-hydraulic type orbit roll or the like.

As shown in FIGS. 13 to 16, in the power steering cylinder 140 that is provided forward of the front axle casing 118, a cylinder casing 141 is located at a right/left intermediate position is embraced and held by extending through boss portions 118A that are integrally attached to respective front portions of the front axle casing 118. The power steering cylinder 140 includes a cylinder rod 142 that can be moved back and forth in the right-left direction within the cylinder casing 141; and tie rods 105, that are coupled to wheel support casings 119, are coupled to right and left end portions of the cylinder rod 142 so as to be bendable, with ball joints 150 being interposed therebetween. Thus, the cylinder rod 142, to which the tie rods 105 are coupled at opposite end portions thereof to be moved back and forth in the right-left direction, serves also as another tie rod for steering the right and left wheel support casings 119 in the same direction.

The tie rods 105 includes: shaft portions 151 that are continuous with the ball joints 150 that are in turn provided at shaft end portions of the cylinder rod 142; and boss portions 152 that are provided on the opposite side to the above-described ball joints 150 of the shaft portions 151.

The boss portions 152 are coupled to the wheel support casings 119, that are coupled the right and left end portions of the front axle casing 118, by fitting the boss portions 152 to coupling shafts 119C, which will be described later.

The front axle casing 118 is attached to the vehicle body frame 110 so as to roll about a horizontal axis z1 that extends in the front-rear direction. The wheel support casings 119 are attached to the right and left ends of the front axle casing 118 so as to be steered about vertical axes y1 of kingpins (not shown).

The front wheels 111 are attached to attachment hubs 119A of the wheel support casings 119. Whereby, the front wheels 111 are steered to the right or the left as the wheel support casings 119 rotate about the axes y1 of the kingpins.

Coupling shafts 119C stand on front upper portions of the wheel support casings 119 so as to extend upward past upper surfaces 119B of the wheel support casings 119. One end of each tie rod 105 is coupled to an end portion of the cylinder rod 142 of the power steering cylinder 140 with a ball joint 150 being interposed therebetween, and the other end of each tie rod 105 is coupled to a coupling shaft 119C.

The boss portion 152 provided on the other end portion of each tie rod 105 is fitted to and coupled to an upper portion of a coupling shaft 119C. The positions at which the coupling shafts 119C and the boss portions 152 are coupled to each other are configured as follows. Shaft portions 119D each with a spherical shape are provided on upper portions of the coupling shafts 119C, and shaft bearing portions 152A, that are recessed in a spherical shape, are formed in the inner surfaces of the boss portions 152 so as to support the shaft portions 119D each with a spherical shape.

This configuration makes it possible to steer the front wheels 111 while keeping the coupled state between the tie rods 105 and the wheel support casings 119 without any problems, even if the tie rods 105 and the wheel support casings 119 change positions relative to each other in the vertical direction or in the horizontal direction.

Figure 13:
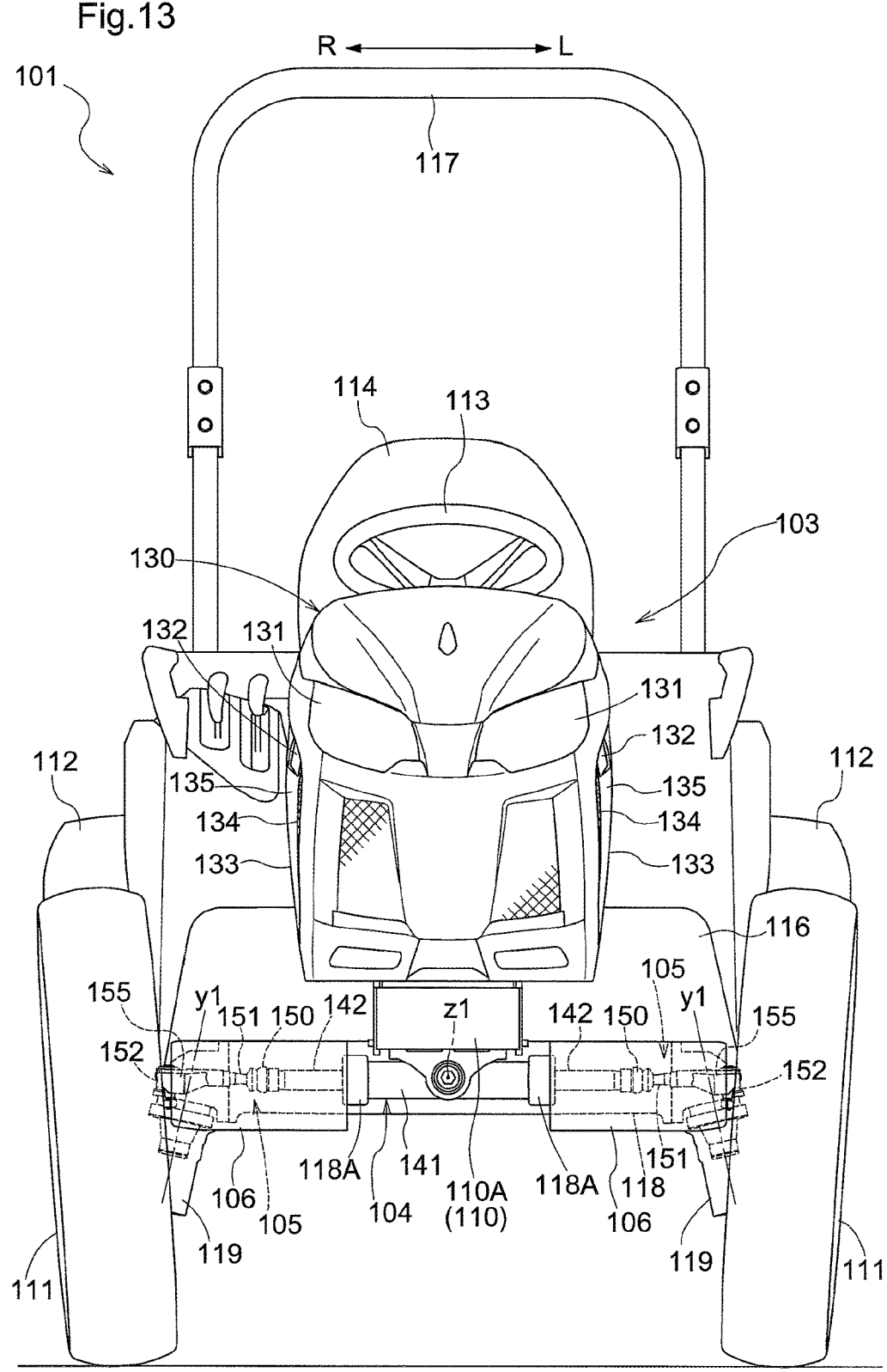
FIG. 13 is an overall front view of the tractor.
Figure 14:
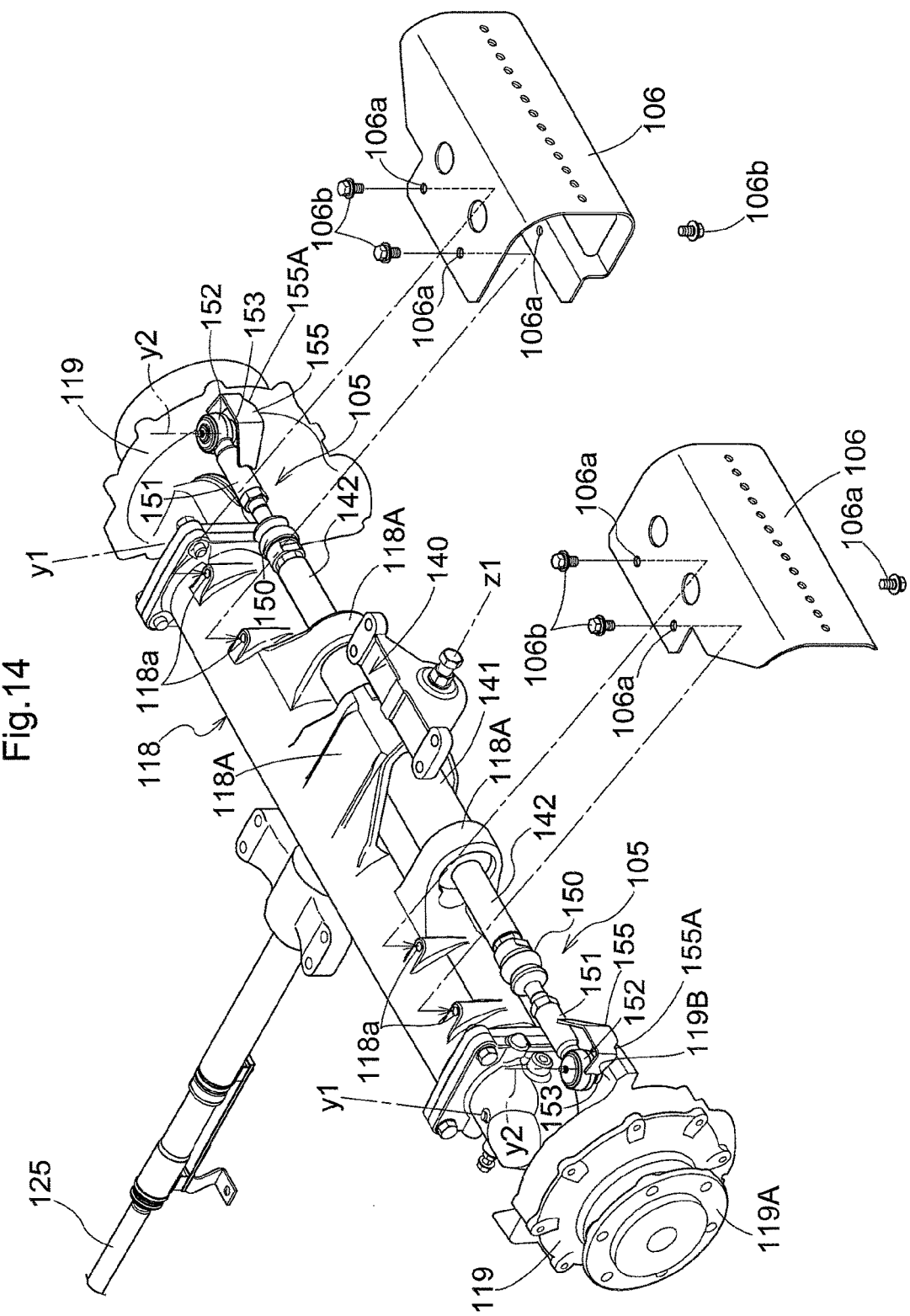
FIG. 14 is an exploded perspective view showing a front axle casing, tie rods and tie rod covers.

As shown in FIGS. 13 and 14, tie rod covers 106 are removably attached to the front side of the front axle casing 118. That is, the tie rod covers 106 are removably coupled and fixed to stopper portions 118a that are formed integrally with an upper surface side portion of the front axle casing 118 via stopper holes 106a that are provided in upper portions of the tie rod covers 106, using bolts 106b.

The tie rod covers 106 are provided so as to close gaps between the right and left end portions of the cylinder casing 141 of the power steering cylinder 140 and the right and left front wheels 111 in a straight travelling state.

Figure 15:
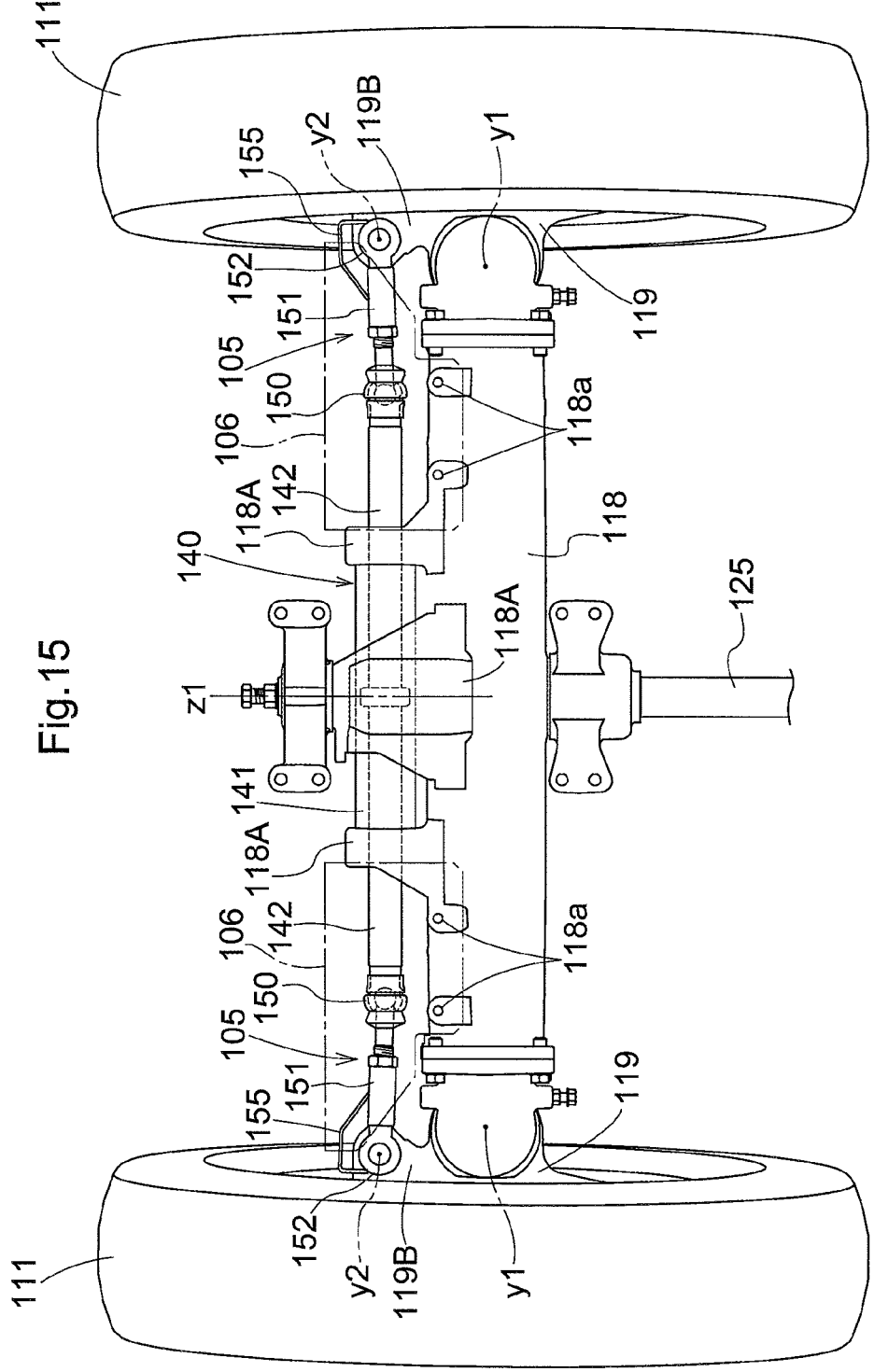
FIG. 15 is a plan view showing the tie rods, the tie rod covers and boot guards in a straight travelling state.

Due to this configuration, as shown in FIGS. 13 and 15, when the front wheels 111 are in a straight travelling state, although the lateral outermost positions of the tie rod covers 106 are located slightly inward of the vehicle body compared with the lateral outermost positions of the tie rods 105 in the right-left direction, the lateral outermost positions of the tie rods 105 and the lateral outermost positions of the tie rod covers 106 are almost the same.

Figure 16:
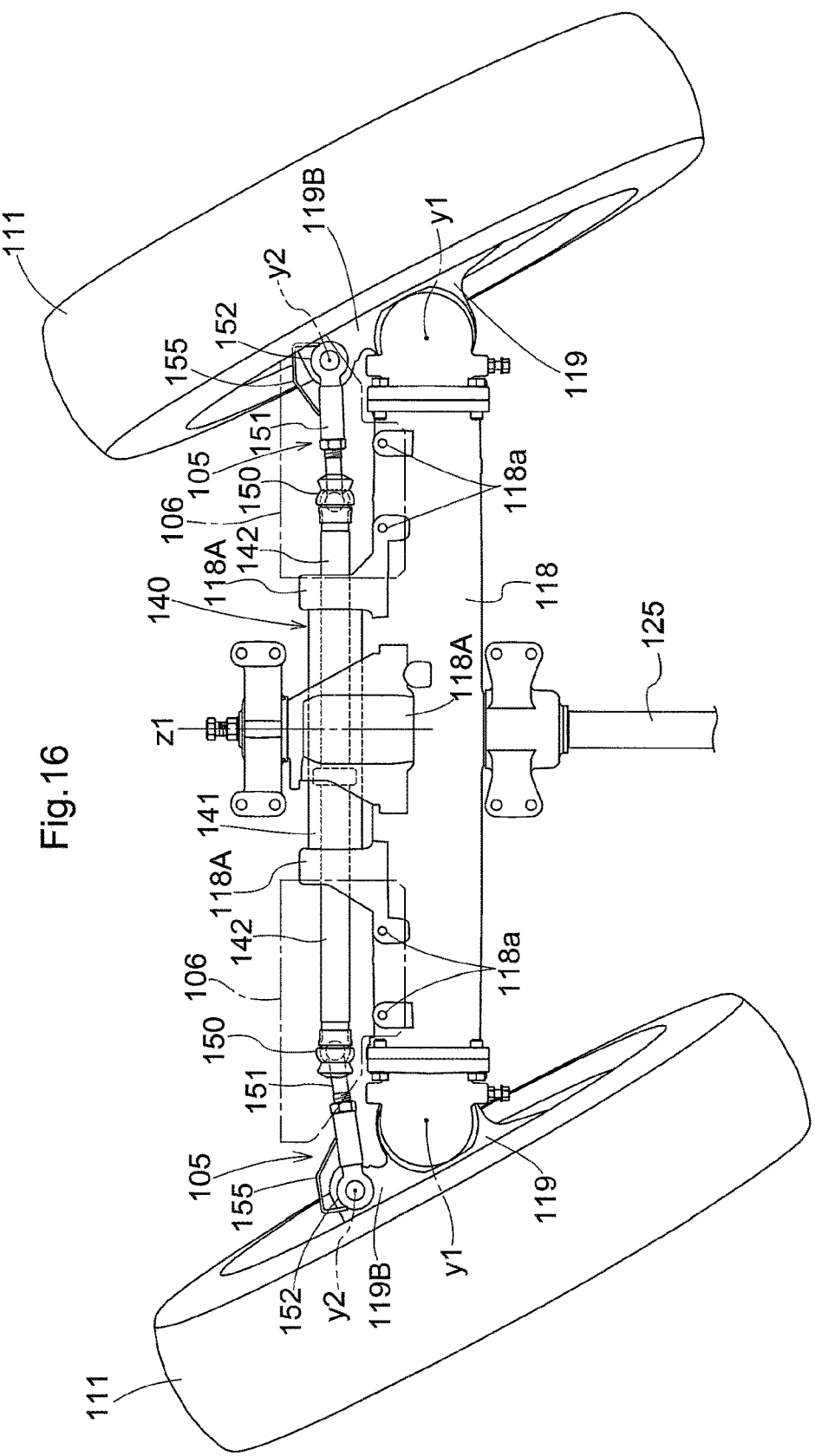
FIG. 16 is a plan view showing the tie rods, the tie rod covers and the boot guards in a turning travelling state.

However, as shown in FIG. 16, upon the front wheels 111 being operated to be turned to the left, the cylinder rod 142 moves to the left, and the left tie rod 105 extends outward in a lateral direction past the lateral outer end of the tie rod cover 106, and protrudes from the lateral outer end of the tie rod cover 106.

Boot Guards

Figure 19:
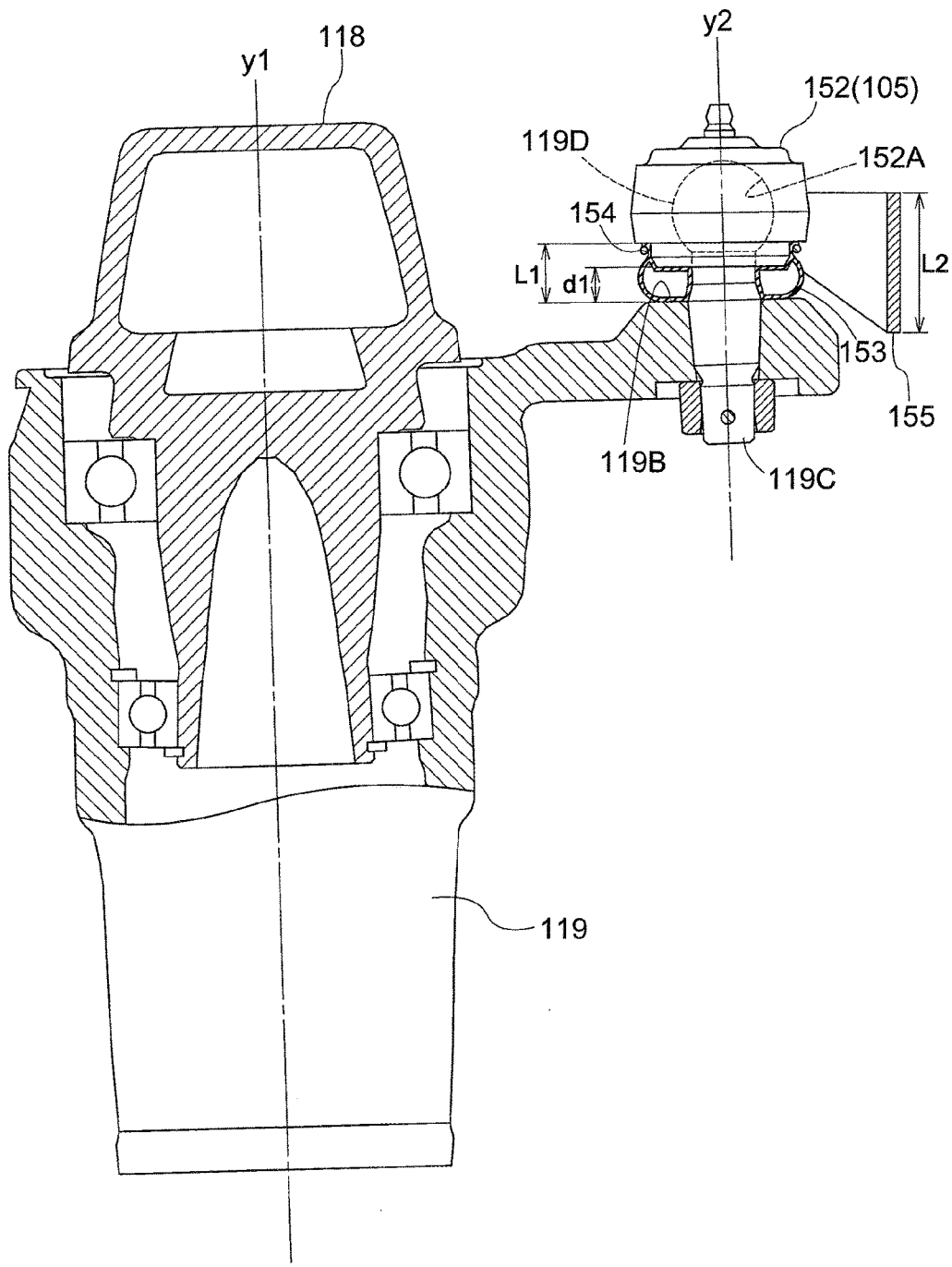
FIG. 19 is a cross-sectional view showing a position at which the wheel support casing and the tie rod are coupled to each other, and also showing the boot guard.

As shown in FIG. 19, dustproof boots 153 are attached so as to span the upper surfaces 119B of the wheel support casings 119 and the boss portions 152 that are provided on the above-described other ends of the tie rods 105 that are fitted and coupled to the coupling shafts 119C that stand on the upper surfaces 119B of the wheel support casings 119.

The dustproof boots 153 are each made of an elastic material such as rubber, and have a tubular shape of which both the upper and lower ends are open. Also, the dustproof boots 153 are sufficiently longer than a distance dl between the upper surfaces 119B of the wheel support casings 119 and the lower surfaces of the boss portions 152 of the tie rods 105 in the vertical direction.

Upper end portions of the dustproof boots 153 are fitted onto and coupled to lower portions of the boss portions 152 of the tie rods 105 using fixing metal parts 154 that have a ring shape, so as to rotate integrally with the boss portions 152. Lower end portions of the dustproof boots 153 are in contact with the upper surfaces 119B of the wheel support casings 119 by being pressed against the upper surfaces 119B from above. With this configuration, the dustproof boots 153 elastically deform such that intermediate portions in the vertical direction swell like bags, and lower end portions thereof are urged to press against the upper surfaces 119B of the wheel support casings 119 due to the elastic restoring force of the dustproof boots 153.

Boot guards 155 that shield the front side of the dustproof boots 153 are provided forward of positions where the dustproof boots 153 with the above-described configuration are present.

As shown in FIGS. 14 to 19, the boot guards 155 are constituted by bent plate-like members that are located forward of the tie rods 105, and are fixed by welding to areas that span from intermediate positions of the shaft portions 151 of the tie rods 105 to outer circumferential surfaces of the boss portions 152 that are located closer to the front wheels 111. Also, as shown in FIGS. 14 to 18, the boot guards 155 are located forward of the dustproof boots 153 and shield the entire width of the dustproof boots 153 in the right-left direction.

As shown in FIG. 19, a vertical width L2 of each boot guard 155 extends long in the vertical direction, from a position that is higher than the position where the dustproof boot 153 is provided, to a position that is lower than where the dustproof boot 153 is provided.

That is, a width L1 of the attached dustproof boots 153 in the vertical direction is longer than the distance dl between the upper surfaces 119B of the wheel support casings 119 and the lower surfaces of the boss portions 152 of the tie rods 105 in the vertical direction, and the width L2 of the boot guards 155 in the vertical direction is longer than the width L1 of the dustproof boots 153 in the vertical direction. Thus, the boot guards 155 are wide in the vertical direction as well so as to shield the entirety of the dustproof boots 153 in the vertical direction.

Figure 12:
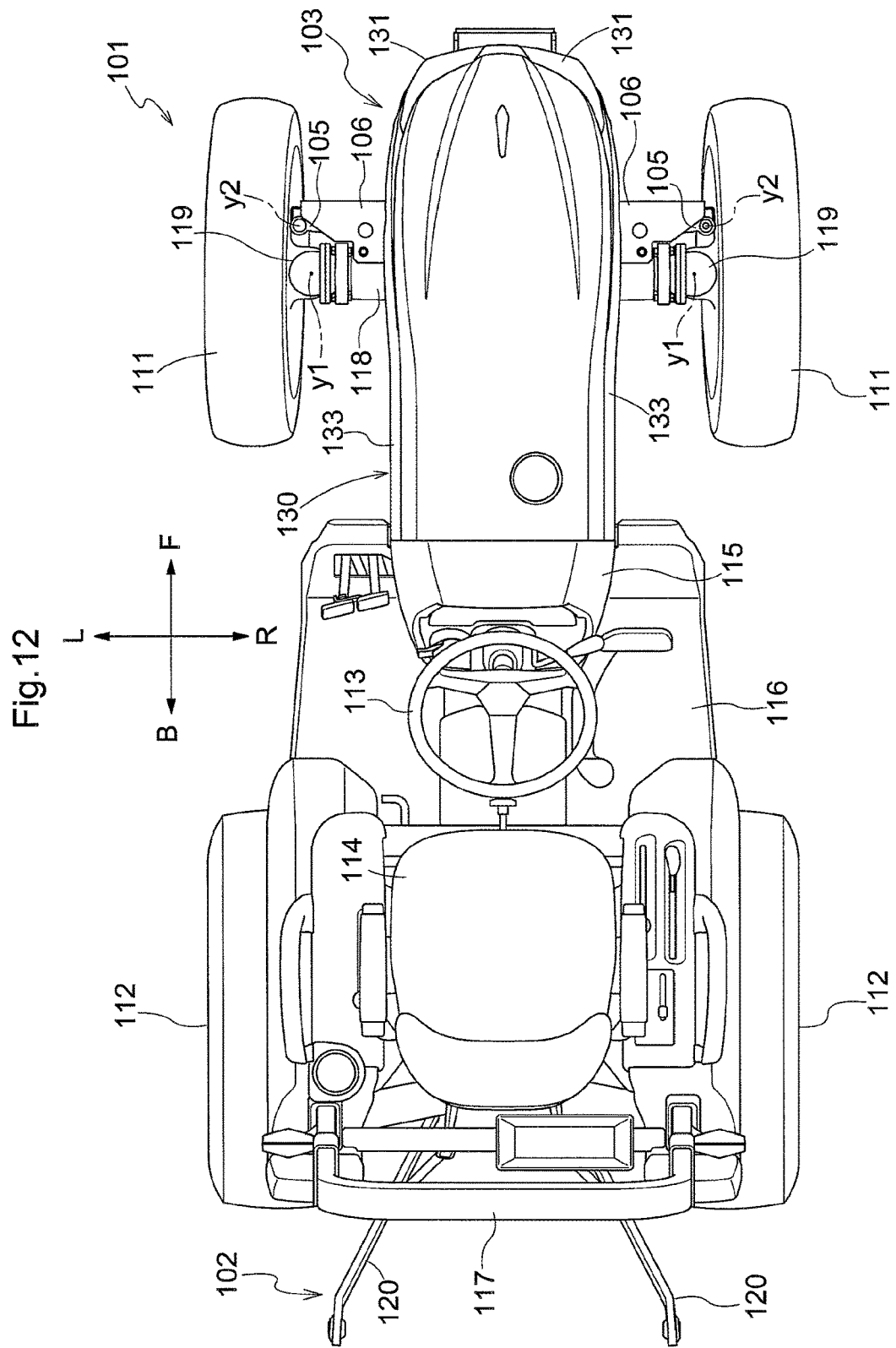
FIG. 12 is an overall plan view of the tractor.

As shown in FIGS. 12, 13 and 15, when the right and left front wheels 111 are orientated in the straight travelling direction, primary portions of the boot guards 155 are hidden behind the tie rod covers 106.

Even in this state, the boot guards 155 are located forward of the dustproof boots 153 and functions to protect the dustproof boots 153 against coming into contact with weeds and crops. However, since the tie rod covers 106, which are much larger in area than the boot guards 155, are present right in front of the boot guards 155 so as to shield the entirety of the boot guards 155, only in this straight-travelling state, the protective function of the tie rod covers 106 dominates over the protective function of the boot guards 155 for the dustproof boots 153.

Figure 17:
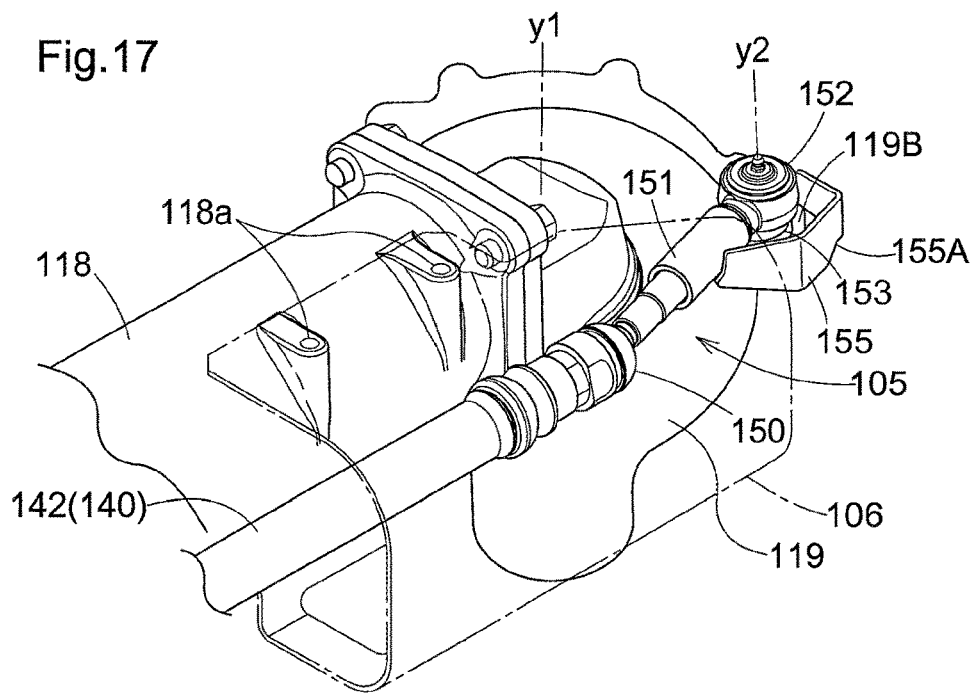
FIG. 17 is a perspective view showing a wheel support casing and a boot guard that are located on the inner side in the turning travelling state.

As shown in FIGS. 16 and 17, upon the cylinder rod 142 of the power steering cylinder 140 protruding in the right or left direction and the front wheels 111 being steered to the right or left direction (FIGS. 16 and 17 show a state in which the front wheels 111 are operated to be turned to the left), the front half of the front wheel 111 that is located on the side of the axis of the turn (the left front wheel 111 in FIG. 16), is steered in a direction away from the laterally outermost position of the tie rod cover 106 as shown in FIG. 16.

In the state as shown in FIG. 16, a large portion of the tie rod 105 is exposed toward the center of the axis of the turn from the left end of the tie rod cover 106, which is indicated by an imaginary line. In association therewith and as a matter of course, the dustproof boot 153 also moves away from the left end of the tie rod cover 106 toward the center of the axis of the turn, and the front portion is exposed if the boot guard 155 is not present.

With such a configuration, it is reliably possible to protect the dustproof boot 153 that is attached to the position where the wheel support casing 119 and the tie rod 105 for the front wheel 111 on the side of the center of the axis of the turn, which is steered as described above, are coupled to each other. That is, due to the boot guard 155 that spans the shaft portion 151 and the boss portion 152 of the tie rod 105 being provided forward of the tie rod 105, the boot guard 155 shields the front side of the dustproof boot 153 that has moved away from the left end of the tie rod cover 106 toward the center of the axis of the turn, and prevents the dustproof boot 153 from coming into contact with weeds and crops.

Figure 18:
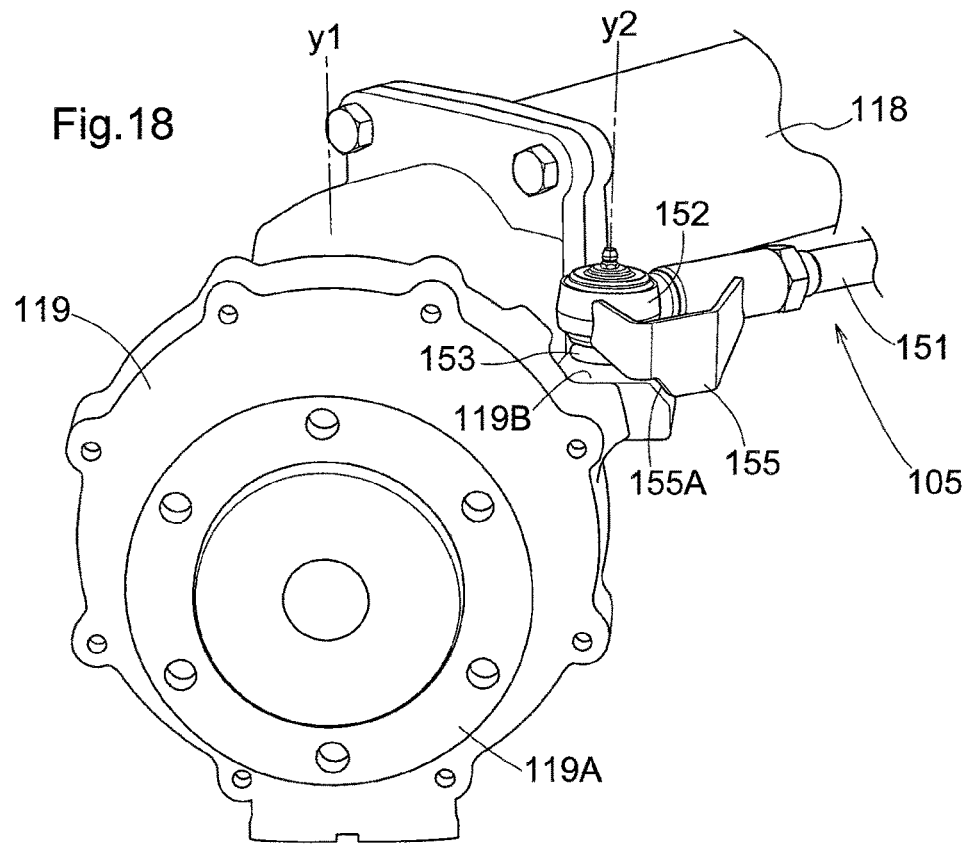
FIG. 18 is a perspective view showing a wheel support casing and a boot guard that are located on the outer side in the turning travelling state.

Also, the boot guards 155 are provided with recessed portions 155A for avoiding interference with the wheel support casings 119, near positions where the boot guards 155 are fixed by welding to the boss portions 152 of the tie rods 105. As shown in FIGS. 14 and 18, the recessed portions 155A are formed such that the lower edges of the boot guards 155 close to portions that are fixed by welding to the boss portions 152 are partially cut away and are recessed upward.

As shown in FIGS. 16 and 18, when the front wheels 111 are steered to the right or left, the front half of the front wheel 111 located outside the axis of the turn (the right front wheel 111 in FIG. 16) is steered to approach the lateral outermost position of the tie rod cover 106 as shown in FIG. 16.

In this case, if the above-described recessed portions 155A are not present in the boot guards 155, there is the risk of the boot guards 155 coming into contact with the wheel support casings 119 and narrowing the steering range of the front wheels 111. However, due to the recessed portions 155A being provided, such a risk is reduced, and advantageously it is possible to maintain a wide steering range.

The recessed portions 155A are respectively formed in the right and left boot guards 155.

Mid PTO

As shown in FIGS. 11 and 20, the mid PTO shaft 124 is provided forward of the transmission case 107 so as to protrude forward.

The following describes a structure for supporting the mid PTO shaft 124.

The mid PTO shaft 124 is constituted by one drawn member, and spline portions 124A are respectively engraved in a front end portion and a rear end portion of the mid PTO shaft 124. A shaft intermediate portion 124B that has a diameter that is the same as or greater than the diameter of the spline portions 124A on both end portions is supported by a supporting boss 171 that is formed on a front case wall 170 of the transmission case 107.

A bearing 172 for rotatably supporting the mid PTO shaft 124 is provided on the inner circumferential surface of the supporting boss 171. A portion of an outer race 172A, on the inner side of the transmission case 107, of the bearing 172 is fixed by a step portion 171A that is formed in the inner circumferential surface of the supporting boss 171, so as to be not movable in the axial direction of the mid PTO shaft 124.

Also, an inner race 172B of the bearing 172 is prevented from moving inward of the transmission case 107 by a circlip 173 that is attached to the outer circumferential surface of the mid PTO shaft 124. The inner race 172B is prevented from moving toward the outside of the transmission case 107 by a positioning sleeve 174 and a circlip 175 that is attached to the outer circumferential surface of the mid PTO shaft 124 so as to prevent the positioning sleeve 174 from moving to the outside of the transmission case 107.

A friction member 174B of the positioning sleeve 174, which is made of rubber, is attached to an inner surface of a tubular portion 174A of the same, which is made of metal, and one end of the positioning sleeve 174 is pressed against the inner race 172B, and the other end portion of the positioning sleeve 174 is pressed against the circlip 175. Thus, the positioning sleeve 174 is configured to prevent the mid PTO shaft 124 from moving in the axial direction.

A sealing member 176, that has a ring shape and prevents external objects from entering the inside, is attached between the outer circumferential surface of the positioning sleeve 174 and the inner circumferential surface of the supporting boss 171.

An end portion of the sealing member 176 on the inner side of the transmission case 107 abuts against the outer race 172A of the bearing 172 with a ring-shaped collar 177 being interposed therebetween; and an end portion of the sealing member 176 on the outer side of the transmission case 107 abuts against a circlip 178 that is attached to the inner circumferential surface of the supporting boss 171, to thereby place the sealing member 176 in position.

Another Embodiment 1

In the foregoing embodiment, the boot guards 155 that are provided only forward of the dustproof boots 153 have been described as examples. However, the present invention is not limited to such a configuration.

For example, the boot guards 155 may be provided not only forward of the dustproof boots 153 but also rearward of the dustproof boots 153 so as to span the shaft portions 151 and the boss portions 152 of the tie rods 105, to thereby shield both the front side and the rear side of the dustproof boots 153.

Regarding other configurations, the same configurations as those in the foregoing embodiment may be employed.

Another Embodiment 2

In the foregoing embodiment, a configuration in which primary portions of the boot guards 155 are hidden behind the tie rod covers 106 when the right and left front wheels 111 are orientated in a straight travelling direction has been described as an example. However, the present invention is not limited to such a configuration.

For example, the boot guards 155 may be provided on the lateral outer side of the tie rod covers 106 when the right and left front wheels 111 are orientated in a straight travelling direction.

Also, the tie rod cover(s) 106 may be omitted.

Regarding other configurations, the same configurations as those in the foregoing embodiment may be employed.

Another Embodiment 3

In the foregoing embodiment, a configuration in which the recessed portions 155A for preventing interference with the wheel support casings 119 are provided in the boot guards 155 has been described. However, the present invention is not limited to such a configuration.

For example, portions of the boot guards 155, which would interfere with the wheel support casings 119, may be formed as a dangling rubber member, or the boot guards 155 may be formed so as to move away from the steering direction upon coming into contact with the wheel support casings 119, and thus an appropriate structure may be employed.

Regarding other configurations, the same configurations as those in the foregoing embodiment may be employed.

INDUSTRIAL APPLICABILITY

The present invention is not limited to a tractor, but may be applied to various kinds of agricultural machines such as a riding type rice transplanter, a riding type direct seeding machine, a lawn mower and a combine; a construction machine such as a wheel loader and a backhoe; and a transporting work vehicle such as a forklift.

DESCRIPTION OF REFERENCE NUMERALS/MARKS

4: Recessed Portion
5: Work Light
30: Engine Hood
31a: Lateral Side Surface
34: Headlight
36, 37: Supporting Member
40: Recessed Portion Inlet Opening
41: Recessed Portion Bottom Surface
42: Peripheral Wall Portion
43: Ventilation Plate Member
43a: Ventilation Hole
51, 52: Coupling Portion
Lc: Light Axis
105: Tie Rod
106: Tie Rod Cover
118: Front Axle Casing
119: Wheel Support Casing
119C: Coupling Shaft
y1: Axis
y2: Axis
152: Boss Portion
153: Dustproof Boot
155: Boot Guard
155A: Recessed Portion

What is claimed is:
1. A work vehicle comprising:
an engine hood that is provided in a front portion of a vehicle body;
a headlight that is provided at a forward position of the engine hood; and
a recessed portion that is provided in a lateral side surface of the engine hood and is recessed from the lateral side surface toward the inside of the engine hood,
wherein the recessed portion includes:
a recessed portion bottom surface that is recessed inward from the lateral side surface of the engine hood,
a recessed portion inlet opening that is formed in an outer lateral side surface of the engine hood, and a peripheral wall portion that is continuous with a peripheral edge of the recessed portion bottom surface and a peripheral edge of the recessed portion inlet opening, and wherein a work light that emits light forward and downward is provided on the peripheral wall portion.

2. The work vehicle according to claim 1, wherein the work light is attached so as to face forward and downward, in an orientation in which the work light does not protrude laterally outward past the lateral side surface.

3. The work vehicle according to claim 1, wherein the work light is located on a rear upper portion of the peripheral wall portion, and is provided in an orientation in which the work light faces forward and downward so that a light axis of light emitted from the work light extends along the recessed portion bottom surface.

4. The work vehicle according to claim 1, wherein a depth of the peripheral wall portion in a direction in which the recessed portion is recessed is set such that a depth of a first portion of the peripheral wall portion on which the work light is provided is greater than a depth of a second portion of the peripheral wall portion that faces the first portion of the peripheral wall portion in a radial direction of the recessed portion.

5. The work vehicle according to claim 1, wherein the recessed portion bottom surface comprises a ventilation grill in which a number of ventilation holes are formed.

6. The work vehicle according to claim 5, wherein
the ventilation grill is formed of a ventilation plate member provided separate from the lateral side surface, and
the work light is provided with coupling portions that are detachably attachable to a supporting member for the work light and to the ventilation plate member, respectively.

* * * * *